United States Patent
Agarwal et al.

(10) Patent No.: US 10,867,281 B2
(45) Date of Patent: Dec. 15, 2020

(54) METHOD AND SYSTEM FOR CREATING STEP BY STEP PROJECTS

(71) Applicant: TRANSFORM SR BRANDS LLC, Hoffman Estates, IL (US)

(72) Inventors: Shubham Agarwal, Arlington Heights, IL (US); Eui Chung, Huntley, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 0 days.

(21) Appl. No.: 14/136,095

(22) Filed: Dec. 20, 2013

(65) Prior Publication Data

US 2015/0178681 A1 Jun. 25, 2015

(51) Int. Cl.
G06Q 10/10 (2012.01)
G06Q 50/00 (2012.01)
G06Q 10/06 (2012.01)
G06Q 30/06 (2012.01)

(52) U.S. Cl.
CPC .......... *G06Q 10/101* (2013.01); *G06Q 10/06* (2013.01); *G06Q 30/0633* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,174,339 | B1 * | 2/2007 | Wucherer | G06F 30/13 |
| 2002/0087577 | A1 * | 7/2002 | Manjunath | G06F 17/30256 |
| 2009/0089651 | A1 * | 4/2009 | Herberger | G06F 17/30056 715/202 |
| 2009/0254457 | A1 | 10/2009 | Folsom | |
| 2010/0057691 | A1 * | 3/2010 | Geppert et al. | 707/3 |
| 2012/0116897 | A1 * | 5/2012 | Klinger et al. | 705/14.73 |

(Continued)

OTHER PUBLICATIONS

Kuznetsov, Stacey, and Eric Paulos. "Rise of the expert amateur: DIY projects, communities, and cultures." Proceedings of the 6th Nordic conference on human-computer interaction: extending boundaries. 2010. (Year: 2010)*

(Continued)

*Primary Examiner* — Michelle T Kringen
(74) *Attorney, Agent, or Firm* — McAndrews, Held & Malloy, Ltd

(57) ABSTRACT

A system and method supporting the assisted creation of media content documenting the details of completing a step-by-step project by a consumer in an Internet-based, social networking/social e-commerce environment. For example, a first user may create web pages documenting a multi-step project, including tagging items such as ingredients, products, utensils, and/or materials that appear in project web page images, with information and links for purchasing the tagged items. A collection of images for use in creating the project web pages may be automatically retrieved from web pages identified by the user. Other users, upon viewing the project web pages may create additional web page(s) documenting their own step variations that are then associated with one or more steps of the project of the first user. Users may choose which of the original project steps and/or step variations to include when requesting information for a customized project of their own choice.

30 Claims, 30 Drawing Sheets

(56) References Cited

U.S. PATENT DOCUMENTS

| | | | |
|---|---|---|---|
| 2013/0061138 A1* | 3/2013 | Spector | 715/256 |
| 2014/0032362 A1* | 1/2014 | Frayman | G06Q 30/0633 |
| | | | 705/26.8 |
| 2014/0058903 A1* | 2/2014 | Hong | G06Q 30/06 |
| | | | 705/27.1 |
| 2014/0310596 A1* | 10/2014 | Lafreniere | G06F 3/048 |
| | | | 715/708 |
| 2015/0066780 A1* | 3/2015 | Cohen | G06Q 10/101 |
| | | | 705/300 |

OTHER PUBLICATIONS

Extended European Search Report for Appln. No. 14199354.3-1955 dated May 15, 2015 (6 pages).
Examiner's Requisition in Canadian Appln. No. 2,869,053 dated Nov. 10, 2015 (5 pages).
Office Action in European Appln. No. 14199354.3 dated Jul. 26, 2016 (6 pages).
European Patent Office, Summons to Attend Oral Proceedings Pursuant to Rule 115(1) EPC, in Application No. 14199354.3, dated Dec. 7, 2017 (8 pages).

* cited by examiner

METHOD AND SYSTEM FOR CREATING STEP BY STEP PROJECTS

FIELD OF THE INVENTION

Certain embodiments of the present invention relate to systems and methods for documenting directions for use by a consumer in performing a step-by-step project. More specifically, certain aspects of the present invention relate to systems and methods supporting the assisted creation of media content documenting the details of completing a step-by-step project by a consumer in an Internet-based, social networking/social e-commerce environment.

BACKGROUND OF THE INVENTION

An individual wishing to engage in a project of making a particular piece of clothing, piece of furniture, food item or recipe, or other thing may use the Internet or other information bases and search tools to identify and view projects of interest. The project may involve a number of steps, and may require certain materials and tools to complete. The examples found on the Internet may not be exactly what the individual wants, and those individuals that do make modifications to the project may not have the skills needed to document their work so that others may see alternative project outcomes and take advantage of information about multiple project variations of other makers of the piece of clothing, piece of furniture, food item or recipe, or other thing of interest.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method supporting the assisted creation of media content documenting details of performing steps of a project of a consumer in an Internet-based, social e-commerce environment, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
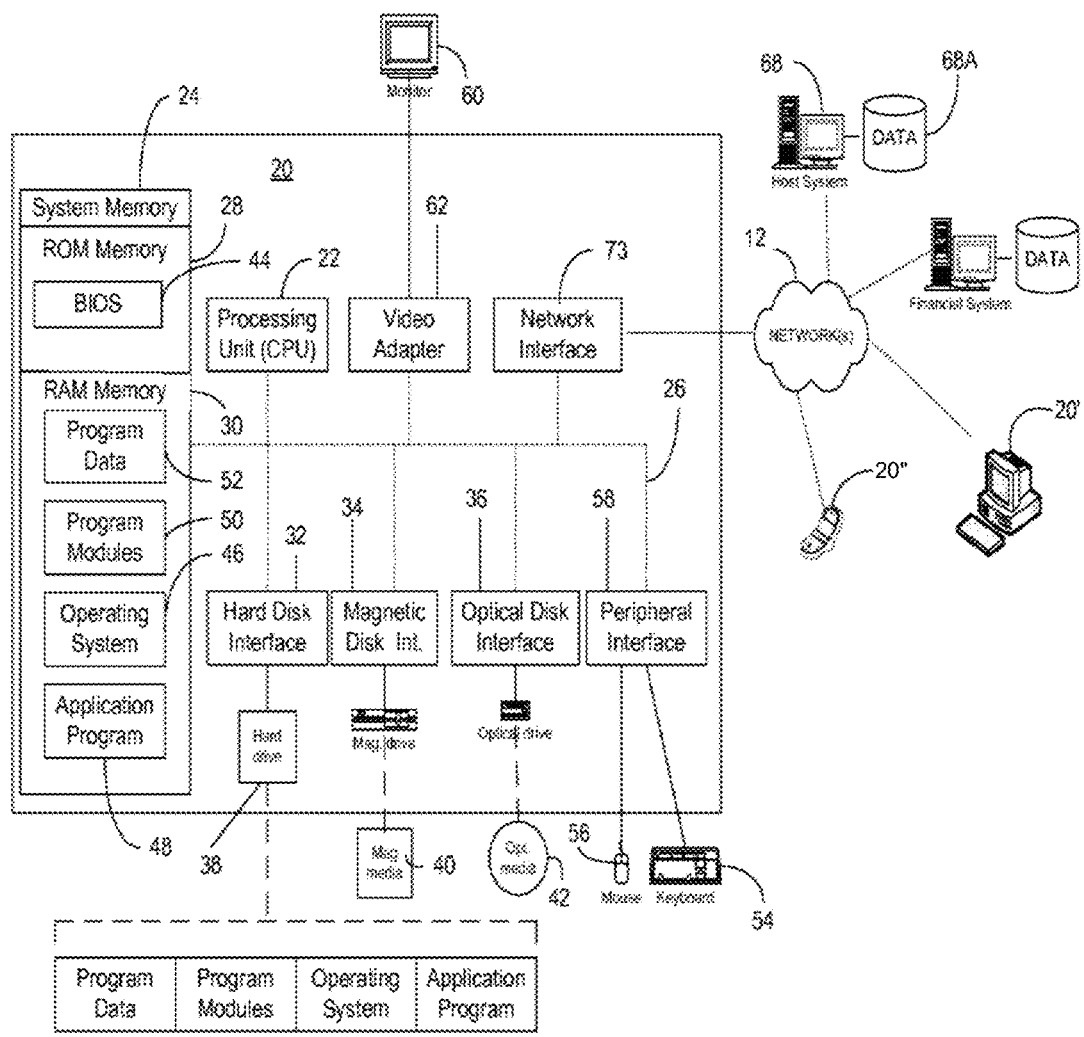
FIG. 1 is an illustration of an exemplary computer network in which a representative embodiment of the present invention may be practiced.

Aspects of the present invention relate to systems and methods for documenting directions for use by a consumer in performing a step-by-step project. More specifically, certain aspects of the present invention relate to systems and methods supporting the assisted creation of media content documenting the details of completing a step-by-step project by a consumer in an Internet-based, social networking/social e-commerce environment.

The following description of example methods and apparatus is not intended to limit the scope of the description to the precise form or forms detailed herein. Instead the following description is intended to be illustrative so that others may follow its teachings.

In the following discussion, the terms "customer," "consumer," and "user" may be used herein interchangeably to refer to a potential or existing purchaser of products and/or services of a business. The term "member" may be used herein to refer to a consumer that belongs to a loyalty program of a merchant or business. A customer, consumer, or user may become a member of a loyalty program of a merchant or business by providing personal information to the merchant or business including, by way of example and not limitation, name; contact information such residence, billing, shipping and/or business addresses; personal interests (e.g., hobbies, stage of life) and/or preferences (e.g., product brand, designer, maker, style, size, color, cost, store location), family members, profession, merchant account information, and credit card account information, to name just a few examples. A member of a loyalty program may be given special privileges (e.g., access to special sales, discounts, or offers) and/or special recognition by the merchant or business both at physical retail locations, and when accessing merchant or business system while online (e.g., e-commerce via the Internet).

The term "social network" may be used herein to refer to a network of family, friends, colleagues, and other personal contacts, or to an online community of such individuals who use a website or other technologies to communicate with each other, share information, resources, etc.

The term "e-commerce" may be used herein to refer to business or commerce that is transacted electronically, as over the Internet. The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The terms "step-by-step project" and "make" may be used interchangeably herein to refer to a sequence of actions or steps performed in order to make or repair something. Examples of a "step-by-step project" or "make" include, by way of illustration and not limitation, a recipe for making a cake or cooking a particular dish; a plan for building a birdhouse, a piece of furniture, or a boat; a set of instructions for performing a repair such as fixing a toaster, a washing machine, or launching a model rocket; a procedure for installing something such as, for example, a dishwasher, a new light switch, a set of gas logs, or a flat screen television; or instructions for painting a picture, taking a photograph, creating a piece of sculpture, sewing a blouse, or stripping the finish from a piece of furniture.

As utilized herein, the term "media content" may be used to refer to one or more of a still image, graphics, motion video, audio, textual content, and/or one or more web pages comprising any of the above.

As utilized herein, the terms "exemplary" or "example" means serving as a non-limiting example, instance, or illustration. As utilized herein, the term "e.g." introduces a list of one or more non-limiting examples, instances, or illustrations.

The methods and systems disclosed herein may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of an exemplary computer network in which a representative embodiment of the present invention may be practiced. The following discloses various example systems and methods for, by way of example and not limitation, supporting the assisted creation of media content documenting the details of completing a step-by-step project by a consumer in an Internet-based, social networking/social e-commerce environment. Referring now to FIG. 1, a processing device 20", illustrated in the exemplary form of a mobile communication device, a processing device 20', illustrated in the exemplary form of a computer system, and a processing device 20, illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a an electronic catalog or inventory system, a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable devices.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; maintaining personal information of customers, receiving a location of a customer via a mobile device; maintaining maps and layouts of buildings and geographic areas; calculating directions or routes within buildings and geographic areas; searching, retrieving, and analyzing media content; receiving a request for a service call center connection from either a customer or a sales associate; routing a received request via a distributed mobile video call center; and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present invention may be seen in a system or method supporting the assisted creation of media content documenting the details of completing a step-by-step project by a consumer in an Internet-based, social networking/social e-commerce environment, as further described below.

A representative embodiment of the present invention permits a user to create a step-by-step project using text and image (e.g., graphics, still images, and motion video) content gathered from various sources including, by way of example and not limitation, personal devices such as their personal computer, camera, camcorder, smart phone, in addition to content retrieved from projects found on a network such as, for example, the Internet. Further, a representative embodiment may permit the user to identify the universal resource locator (URL) of a web site on which a project of interest to the user is located, and to use information from the web-based project of interest in the creation of a customized project of the user.

A system in accordance with the present invention may then access web pages from the web site at the identified URL, and may analyze the pages accessible via the web site URL. The analysis may include, for example, parsing markup language descriptions of the web pages of the web site, including pages comprising hypertext markup language (HTML) elements that identify various items of media content that are part of or accessible via the web pages of the web site such as, by way of example and not limitation, still images, graphics, motion video, audio, and textual content. A representative embodiment of the present invention may categorize the various forms of content, and may display to the user, a visual catalog of content such as, for example, images, text, video segments, and the like, from which the user may pick in assembling content for web pages that display details of their own project.

A representative embodiment of the present invention may make available one or more web page templates suitable for use in creating web pages of a step-by-step project, and may provide the tools needed to select from the collected media content shown by visual catalog, the items of media content most useful in creating each of the steps of the user project.

A representative embodiment of the present invention permits the user to tag or identify various portions each of the images illustrating the project steps, to enable the user to add information such as, for example, information about sources and availability, pricing, quality, and/or comments about the tagged or identified item, material, tool, supply, and/or ingredient.

By way of example, and not limitation, a first user may decide that they would like to build a particular item, e.g., a coffee table, for his/her home, and may search the Internet for example projects for the construction of a table similar to what they would like. The first user may select a particular project found on a web site, upon which they decide to base a project documenting construction of the coffee table of their own design. The first user may make note of the URL at which details of the selected coffee table project reside. The first user may then access a system in accordance with a representative embodiment of the present invention, and may request the system to access the project content at the noted URL, and to automatically analyze and extract various portions of the content. The first user may then use the capabilities of the system to create one or more web pages displaying the steps of completing their own coffee table project using portions of the extracted content from the web site or images from their own collection stored on a device of the user, and may include on the created web pages, information for completing the project including, for example, information about specific utensils, tools, products, supplies, and/or materials selected by the first user, and instructions for completing their own approach to the construction of a coffee table that is particularly suited to them.

Later, other users may also access the system, and those other users may view the coffee table project of the first user, and the various details of the steps of the project. The other users may choose to add information about their own ideas and/or variations to the various steps of the project of the first user, including selecting and adding further information about specific utensils, tools, products, and/or materials that they prefer; comments about aspects of the project; sources for the utensils, tools, products, supplies, and/or materials; and images showing the appearance at one or more stages of completion of their variation on the coffee table of the first user.

A system in accordance with a representative embodiment of the present invention may support project activities of multiple users, and may keep track of the various utensils, tools, products, supplies, and/or materials selected by those users along with information identifying the projects for which each utensil, tool, product, supply, and/or material was used. The system may make information about the types of projects for which a particular utensil, tool, product, supply, and/or material was chosen, or the frequency with which a particular utensil, tool, product, supply, and/or material is chosen by users of the system. A representative embodiment of the present invention may, for example, maintain records of the various things needed for a project such as, for example, tools, utensils, supplies, ingredients, and/or materials identified in association with various projects of the community of users of the system, and based upon those records be able to identify the most popular ingredients, tools, utensils, and materials employed in the projects of the users. The system may, furthermore, offer to users information about the variety of alternatives the community of users has chosen for a given tool, utensil, material, ingredient, and/or supply used for a particular project or recipe. A representative embodiment of the present invention may also permit a user to store information that identifies to the system the utensils, tools, products, ingredients, supplies, and/or materials that they have, want, and/or like, and may permit the user to search for projects to complete based upon the use of particular utensils, tools, products, ingredients, supplies, and/or materials.

Figure 2A:
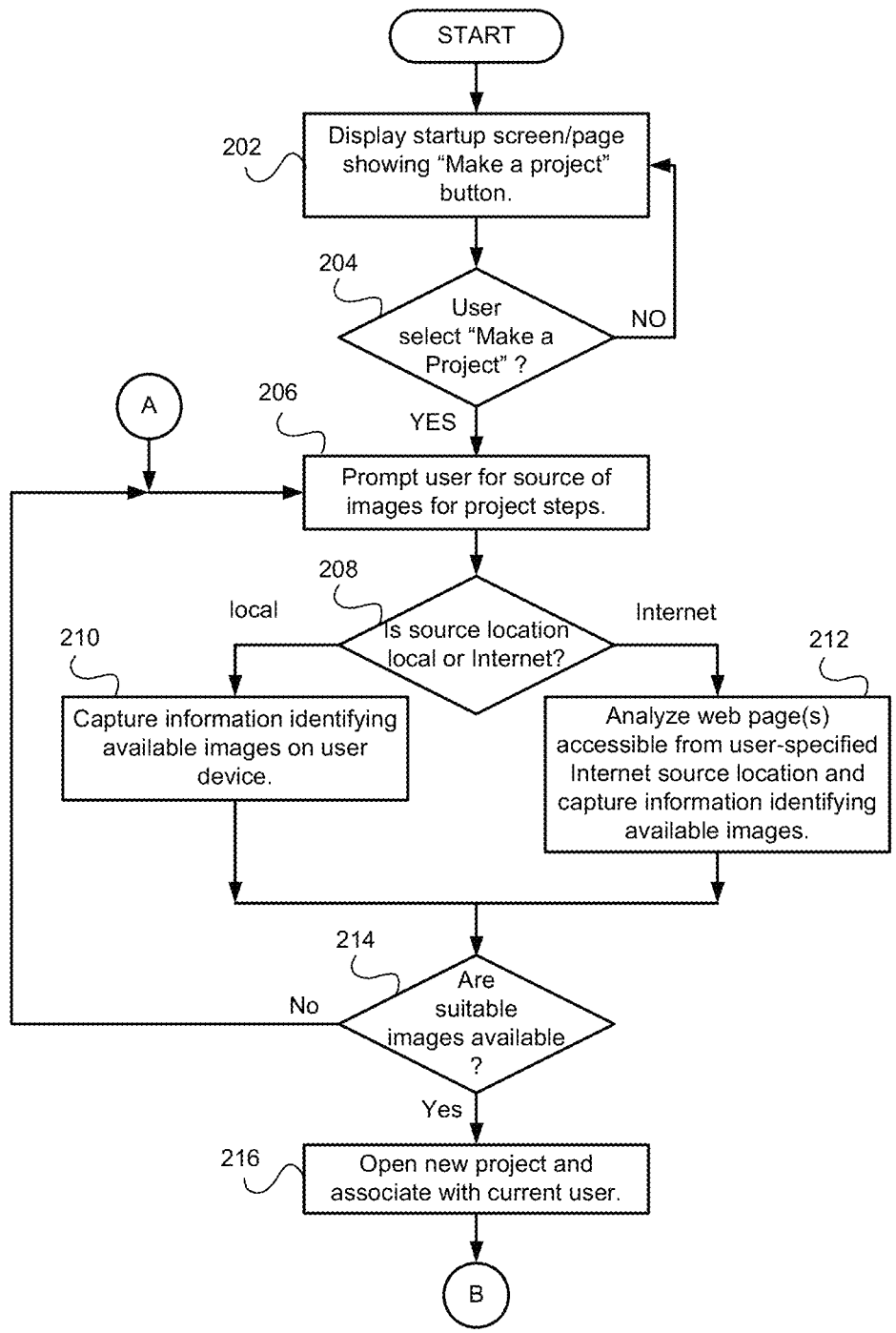
FIGS. 2A-2C are a flowchart representing the steps of an exemplary method of operating a system supporting user creation of media content documenting the details of completing a step-by-step project, in accordance with a representative embodiment of the present invention.
Figure 2B:
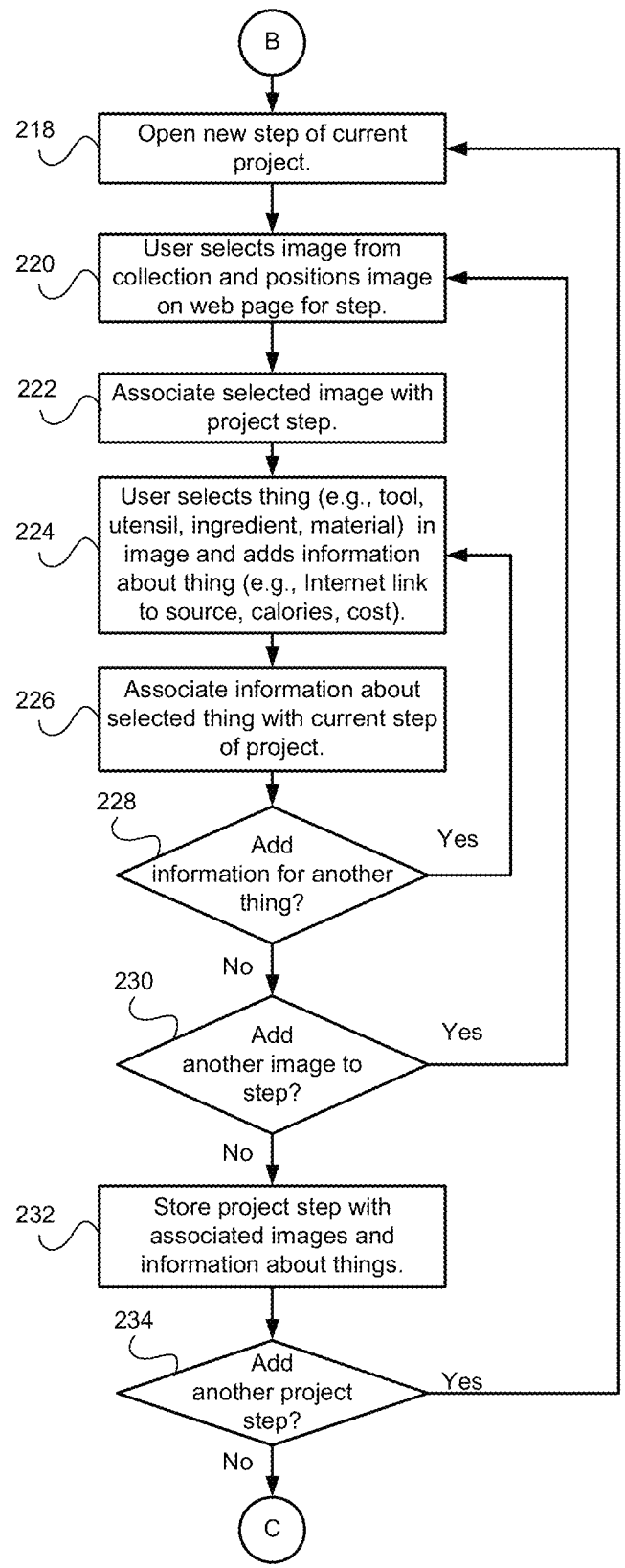
Figure 2C:
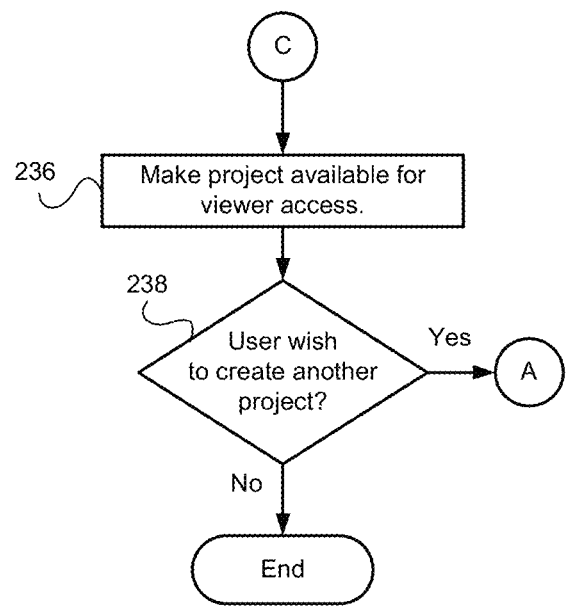

FIGS. 2A-2C are a flowchart representing the steps of an exemplary method of operating a system supporting user creation of content documenting the details of completing a step-by-step project, in accordance with a representative embodiment of the present invention. The following discussion of FIGS. 2A-2C may make reference to various elements of the computer network of FIG. 1, which may, for example, be used to support creation of media content by a consumer in an Internet-based, social networking/social e-commerce environment.

The method illustrated in FIGS. 2A-2C begins at block 202, where a system such as, for example, the host system 68 of FIG. 1, may send digital information representing a web page to a user device such as, for example, a personal computer (PC) or smart phone, in which the information for display includes a user interface element such as, for example, a "button" that enables the user to choose to "make" a project. Next, at block 204, the system may determine whether the user has clicked on/selected the "make button," and may loop back to block 202 if the user has not chosen to "make" a project. If, however, the user chooses to create a project by clicking on/selecting the "make button," the method then, at block 206, may prompt the user for information about the project, and to identify a source of images to be used in creating the steps of the project by, for example, entering information identifying a folder, or a file path to images on the user device, or a universal resource locator (URL) that identifies the web (Internet) location of a source of images for the user project. The method then, at block 208, determines whether the source of images is on the user device or at an Internet location.

If the user identified a location of images on the user device, the method then, at block 210, captures information identifying any available images on the user device at the identified location. Information that may be used to identify available images may include, for example, a file name format or suffix, metadata that may be associated with a file, or the result of an analysis of contents of files that are potential sources of images. The method of FIG. 2A then proceeds to block 214, described below. If, however, the user identified an Internet location of images (e.g., by specifying a URL), the method then, at block 212, retrieves and analyzes any web page(s) accessible via the user-identified URL, and captures from those web page(s), information identifying images (e.g., still images or motion video) that may be available for inclusion in the user project. The analysis of web pages accessible via the identified URL may include, for example, parsing of the digital information representing the web page(s) and recognition of various elements of one or more page description or markup language(s) used in expressing the identified web page(s) in digital form, or in web page(s) accessible via references (e.g., links) on the identified web page such as, by way of example and not limitation, hypertext markup language (HTML), extensible markup language (XTML), or portable document format (PDF) information. The image information at the identified locations of the various sources (e.g., those at the identified location on the user device, and/or those images accessible via the identified URL) provides the user with a collection of images that may be used for the creation of the steps of their own project. The method of FIG. 2A then proceeds to block 214.

At block 214 of FIG. 2A, the method determines whether any suitable images were found to be available for user creation of one or more web page(s) illustrating the steps of the user project. If no suitable images were found on the user device or via the specified URL, the method of FIGS. 2A-2C loops back to block 208 of FIG. 2A, to prompt the user for an alternate/additional source of images. If, however, it is determined, at block 214, that suitable images are available, the method continues at block 216, where the method directs the system to open a new "project," and associates the new project with the current user of the system.

Next, at block 218 of FIG. 2B, the system opens a new "step" for the current open project and displays a web page or screen for creating the newly opened step. Then, at block 220, the user may select an image from the collection of images gathered from the source(s) identified by the user, and may position the selected image on the web page for the current project step. The system then, at block 222, associates the image selected by the user with the current step of the user's project. Next, at block 224, the user may, e.g., using a mouse, touch screen, or other suitable input means, click on/select something shown in a portion of the image such as, by way of example and not limitation, a tool, a utensil, a material, an ingredient, or some supply used for the project, to "tag" that particular thing. The user may then enter information about the "tagged" thing (e.g., a URL or other information identifying a source of the thing, the cost of the identified thing, the amount of calories/sodium/fat in an ingredient). The method then directs the system, at block 226, to associate the information about the tagged thing with the current step of the project. In addition, the system may add information about the use of the "tagged" thing in a database identifying the various tools, utensils, materials, ingredients, and supplies that are used in the various user projects maintained by the system.

Next, at block 228, the method determines whether the user wishes to add information for another of the things shown in the current image for the current step of the project. If the user does indicate that they wish to "tag" another item, the method continues at block 224, described above. However, if the user doesn't wish to "tag" another item in the current image, then the method, at block 230, determines whether the user wishes to add an additional image to the current project step. If the user chooses to add another image to the current project step, the method continues at block 220, described above. If, however, the user does not wish to add another image to the current project step, the method moves on to block 232, where a system such as, for example, the host system 68, stores the current project step in association with the user-selected images and information about things that the user has "tagged" in the selected images for the step. The method then, at block 234, determines whether the user wishes to add another step to the current project. If the user does wish to add another step to the current project, the method of FIGS. 2A-2C passes control to block 218, to open a new step for the current project, as described above. However, if the user chooses not to add another step to the current project, the method continues at block 236 of FIG. 2C, where the current project is made available for access by other users of the system. The method then, at block 238 of FIG. 2C, determines whether the user wishes to create another project. If the user does wish to create another project, the method passes control to block 206 of FIG. 2A, described above. If the user does not wish to create another project at this time, the method of FIGS. 2A-2C ends.

Figure 3A:
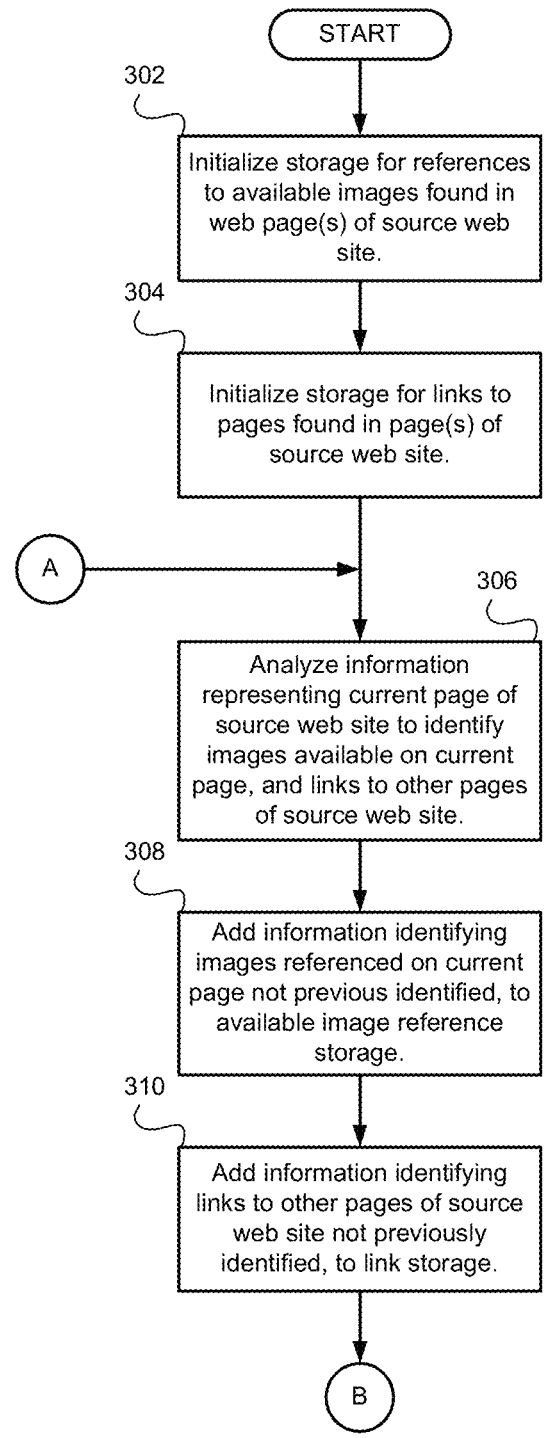
FIGS. 3A-3B show a flowchart representing the steps of an exemplary method of analyzing web pages accessible from a user-identified URL, to identify images that are available for use in creation of a step-by-step project by a user that may, for example, be used to perform the analysis at block of FIG. 2A, in accordance with a representative embodiment of the present invention.
Figure 3B:
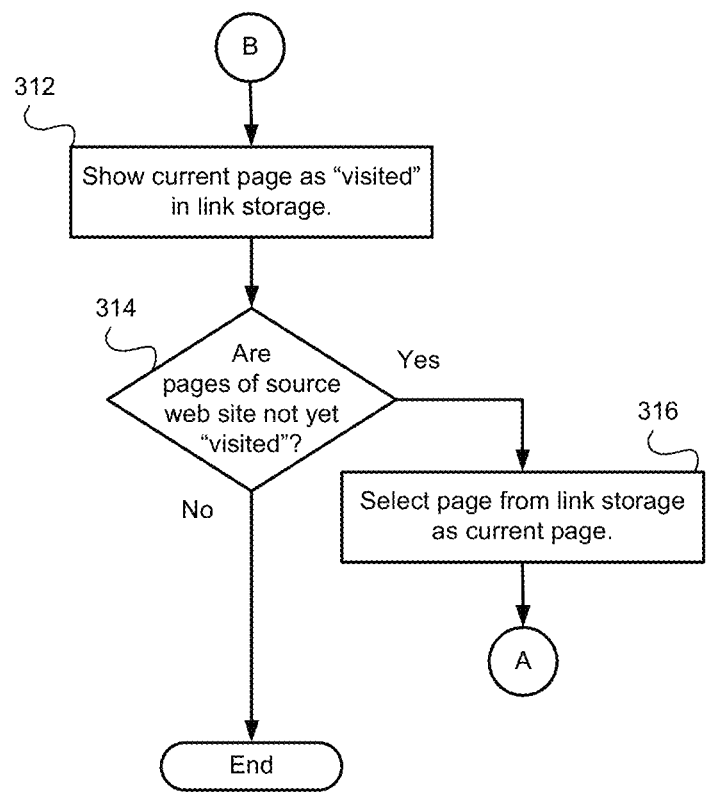

FIGS. 3A-3B show a flowchart representing the steps of an exemplary method of analyzing web pages accessible from a user-identified URL, to identify images that are available for use in creation of a step-by-step project by a user that may, for example, be used to perform the analysis at block 212 of FIG. 2A, in accordance with a representative embodiment of the present invention. The following discussion of FIGS. 3A-3B may make reference to various elements of the computer network of FIG. 1, which may, for example, perform the method shown in FIGS. 3A-3B, and be used to support creation of media content by a consumer in an Internet-based, social networking/social e-commerce environment.

The method of FIGS. 3A-3B begins at block 302, where storage to hold references to available images found in web page(s) accessible via a web page identified by the user, is initialized. Next, at block 304, storage to hold links to web pages found in the source web page identified by the user selected URL, is initialized. Then, at block 306, the method of FIGS. 3A-3B analyzes the digital information that represents the current web page of the source web site, to identify images available on the current web page, and to identify links to other web pages. Next, at block 308, the method adds information identifying images referenced on the current web page that have not previously been identified, to the storage for references to available images. Then, at block 310, the method adds links to other web pages of the source web site that are referenced on the current web page and that have not been previously identified, to the storage for links to web pages found in a source web page. At block 312, the method stores information that identifies the current web page as having been "visited," in the storage identifying links to other pages from the source web site. The method then, at block 314, determines whether there are web pages that are accessible from the web page identified by the user-selected URL, that have not yet been "visited" by the method. If it is determined that web pages that have not yet been "visited" are accessible from the user-selected URL, the method, at block 316, selects a web page from the storage identifying links from the source web site to other web pages, and the method then continues at block 306, described above. If it is determined, at block 314, that no web pages remain that are accessible from the user-selected URL and that have not yet been "visited," the method of FIGS. 3A-3B is finished, and the storage of available images contains references to all images accessible from the URL identified by the user.

FIGS. 4A-4D show a flowchart representing the steps of an exemplary method that permits viewing of a step-by-step project such as, for example, a user project created using the methods of FIGS. 2A-2C and FIGS. 3A-3B, and that supports the creation and storage of variations associated with steps of the viewed project, in accordance with a representative embodiment of the present invention. The following discussion of FIGS. 4A-4D may make reference to various elements of the computer network of FIG. 1, which may, for example, perform the actions of the method shown in FIGS. 4A-4D, to enable the creation of media content for project step variations in an Internet-based, social networking/social e-commerce environment.

The method of FIGS. 4A-4D begins at block 402, when a user of a system that supports creation and viewing of step-by-step projects according to a representative embodiment of the present invention, selects a particular project in order to view the information for the project. Following selection of the project of interest to the user, the method, at block 404, initializes or sets the current step to be the first step of the project of interest to the user. Next, at block 406, the method displays the various items of information for the current step including, by way of example and not limitation, images showing the tools, utensils, ingredients, supplies, and/or materials for the project step; information identifying any "tagged" items in the images for the step; instructions for performing the project step; and any comments by the creator of the project or from others. The method, at block 406, may also display the identity and image of the creator of the selected project; and the identities, including images, of any user(s) that have "tagged" elements of the images, or that have added comments or other information to the current project step. Then, at block 408, the method of FIGS. 4A-4D may display image(s) and/or information identifying users that have contributed one or more variation(s) associated with the current project step.

Next, at block 410, the method may determine whether the user has selected the image or other representation of a contributor of a variation of the current project step. The term "variation" is used herein to refer to a customization of one or more steps of an existing project, in which the user that contributed the variation provides information specifying alternative instructions for performing the project step(s), and/or alternative utensils, tools, materials, supplies, and/or ingredients to be used for in completing the project step. If it is determined, at block 410, that the user has not selected a user interface element (e.g., an image of the contributor, a text string showing their name) representing one of the contributors of a variation for the current project step, then the method continues at block 414, described below. If, however, it is determined, at block 410, that the user has selected a user interface element representing one of the contributors of a variation for the current project step, then the system performing the method will, at block 412, display information such as, by way of example and not limitation, any images, instructions, comments, tags, utensils, tools, materials, supplies, and/or ingredients associated with the variation submitted by the selected contributor for the current project step. If the selected contributor has submitted multiple variations for a particular project step, the method may display information representing each variation, to enable the user viewing the project step to view the information for each of the variations by the selected contributor.

At block 414, the method of FIGS. 4A-4D determines whether the user viewing the current project wishes to add a variation to the current project step. This may be determined, for example, by asking the user if they wish to add a variation, or by displaying, on the project step web page, a "button" or other user interface element that enables the user viewing the project to indicate the desire to add their own variation on the current step. If, at block 414, the user viewing the current project does not wish to add a variation to the current project step, then the method proceeds to block 416, where the method determines whether the user has indicated that they wish to move to the next step of the project. If, at block 416, it is determined that the user wishes to move to the next project step, the method proceeds to block 406, described above. If, however, at block 416, the method determines that the user does wish to add their own variation to the current project step, then, at block 420, the system performing the method creates a new project step (e.g., a web page or screen) in which the contributor creates a variation of the current project step, and stores information that associates the new project step for the variation (e.g., shown in the web page or screen) with the user (i.e., the contributor) and with the current project step.

Next, at block 422, the user may select one or more images for use in creating the project step variation, and may position each image on the web page for the project step variation. In some representative embodiments of the present invention, the contributor may be asked to identify a source of images from which to select, in a manner similar to that described above with respect to blocks 206, 208, 210, 212, and 214 of FIG. 2A.

Next, at block 424, the method associates the image(s) selected by the contributor, with the project step variation. Then, at block 426, the user may select a thing (e.g., a utensil, a tool, an ingredient, a material, and/or a supply) represented in an image for the step variation, and may add information about the selected thing (e.g., cost to purchase, source where the thing may be purchased, and/or information about the thing (e.g., make, model, size, color, amount of calories/fat/sodium, nutritional properties of an ingredient). At block 428, the information about the selected thing is then stored, in association with the current project step variation of the contributor.

Next, at block 430, a determination is made as to whether the user has asked to add information for another thing in the image. If the user has requested to add information for another item in the image, the method continues at block 428, described above. If, however, at block 430, the user does not request to add information for another item in the image, the method continues at block 432, where a determination is made as to whether the user wishes to add an additional image to the project step variation. If the user wishes to add another image to the variation of the current project step, the method of FIGS. 4A-4D returns to block 422, described above. If the user does not wish to add another image to the variation of the current project step, the method continues at block 434, where the method stores images and information for the variation of the current project step in association with the current project step. Then, at block 436, information identifying the contributor of the project step variation is stored and associated with the project step variation and the current step of the selected project. The method then moves to block 438.

At block 438, a determination is made as to whether the user viewing the current project wishes to view additional steps of the selected project. This determination may be made based on input from the user such as, for example, user selection of a first user interface element of a web page for the project step, if the user wishes to continue with the next project step, or user selection of a second user interface element of the web page, to indicate that the user is done viewing steps of the selected project. If the user does wish to view additional steps of the selected project, the method of FIGS. 4A-4D proceeds at block 407 of FIG. 4A, where the next step of the selected project is made the "current" step, and the method then continues at block 406, described above. If, however, at block 438, the user does not wish to view additional steps of the selected project, the method of FIGS. 4A-4D proceeds at block 440 of FIG. 4C, where a determination is made as to whether the user wishes to add comments to the selected project. If the user does not wish to submit comments for the selected project, the method of FIGS. 4A-4D continues at block 444, described below. If, however, the user does wish to add comments, any comments provided by the user are stored in association with the selected project, at block 442, and the method then continues at block 444.

At block 444, a determination is made as to whether the user viewing the selected project wishes to actually make the selected project. If the user indicates that they do not wish to make the selected project, the method if FIGS. 4A-4D continues at block 452, described below. If, however, the user does wish to complete the selected project, the method then, at block 446, provides the user with a list identifying all of the things associated with the steps of the selected project such as, by way of example and not limitation, information identifying the various tools, utensils, materials, supplies, and/or ingredients that are needed to complete the selected project. Such information may include, for example, sources for the things needed for the project; the make, model, size, color, style, or any other characteristics needed to fully identify the things used in completing the project; and the cost of each thing needed for the project. The list may provide stock keeping unit (SKU), item numbers, model numbers, UPC codes, and/or any other information that uniquely identifies the things needed for the selected project.

It should be noted that if the selected project has step variations associated with any steps of the project, the system performing the present method may indicate that variations are available, following selection of the project for viewing. The indication that variations of steps of a selected project are available may be in the form of information and/or images identifying the contributors of the step variations. The user selecting a project for viewing may, for example, choose to view the variations of a particular contributor of a variation, by selecting a user interface element (e.g., an icon, a piece of text, and/or an image of the contributor and/or of the end result of the project with the variations added by the contributor), that may be displayed on an initial web page for the project, or on a later web page of a step of the selected project.

Figure 4A:
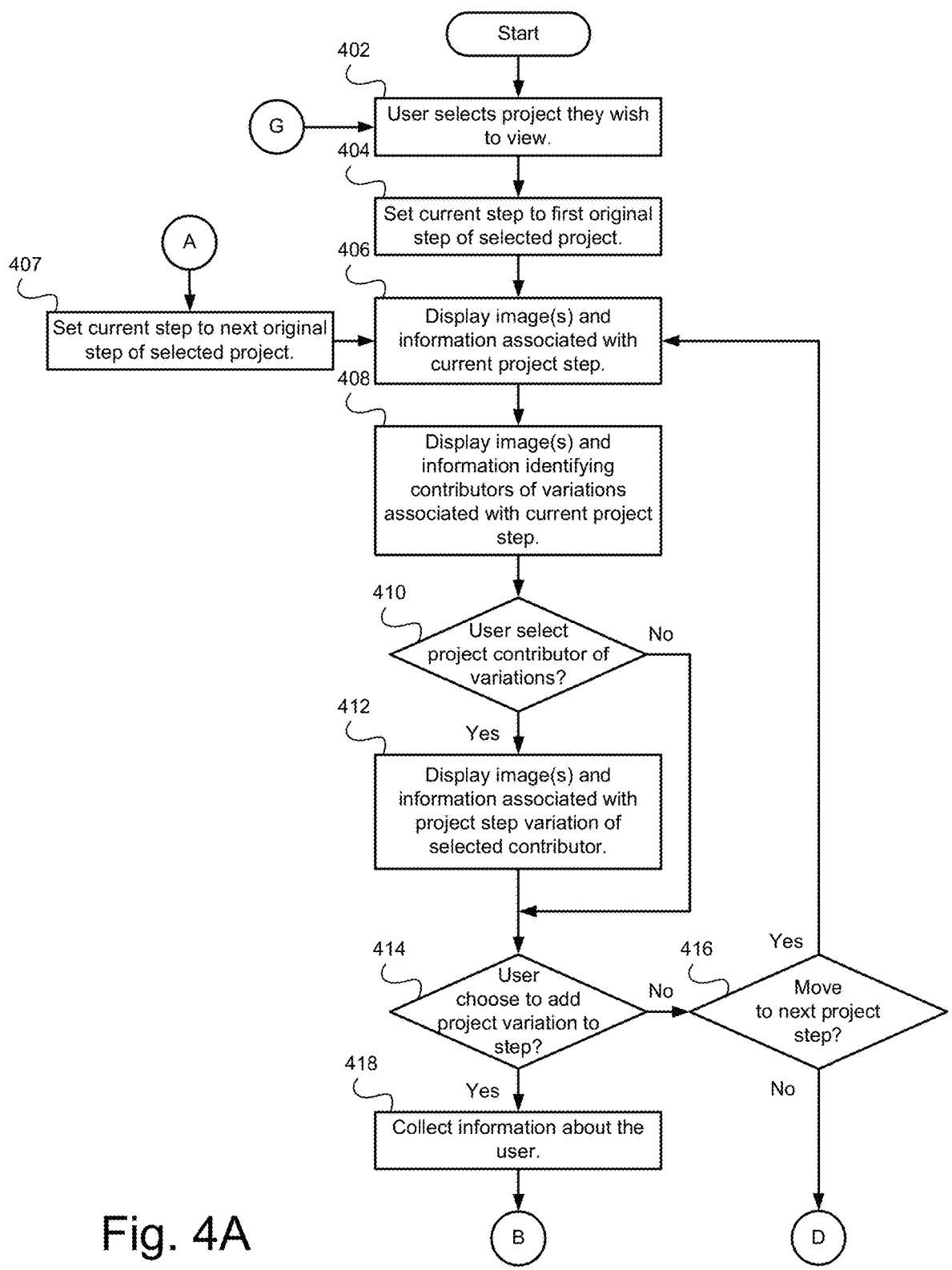
FIGS. 4A-4D show a flowchart representing the steps of an exemplary method that permits viewing of a step-by-step project such as, for example, a user project created using the methods of FIGS. 2A-2C and FIGS. 3A-3B, and that supports the creation and storage of variations associated with steps of the viewed project, in accordance with a representative embodiment of the present invention.
Figure 4B:
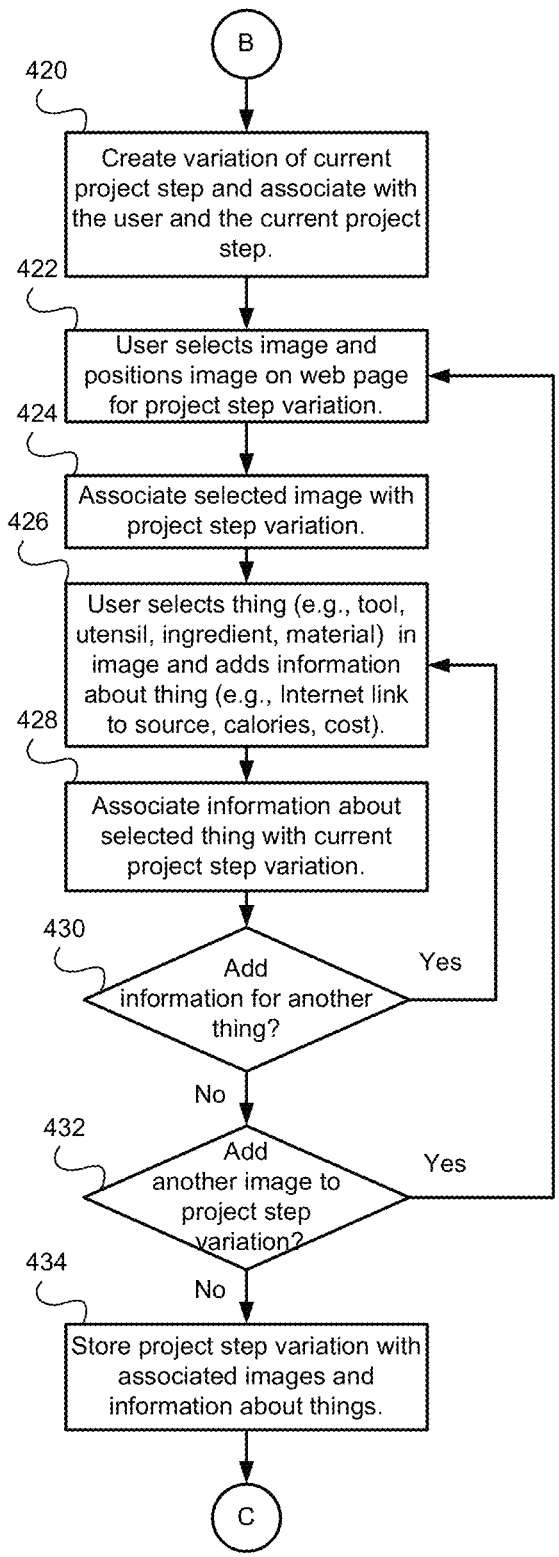
Figure 4C:
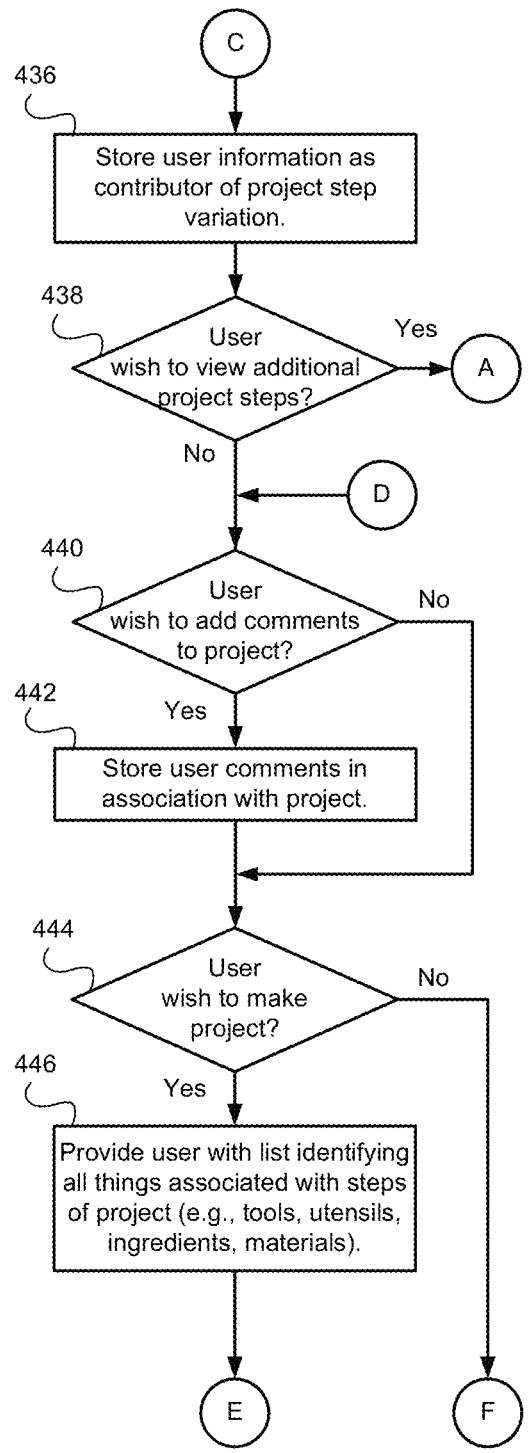
Figure 4D:
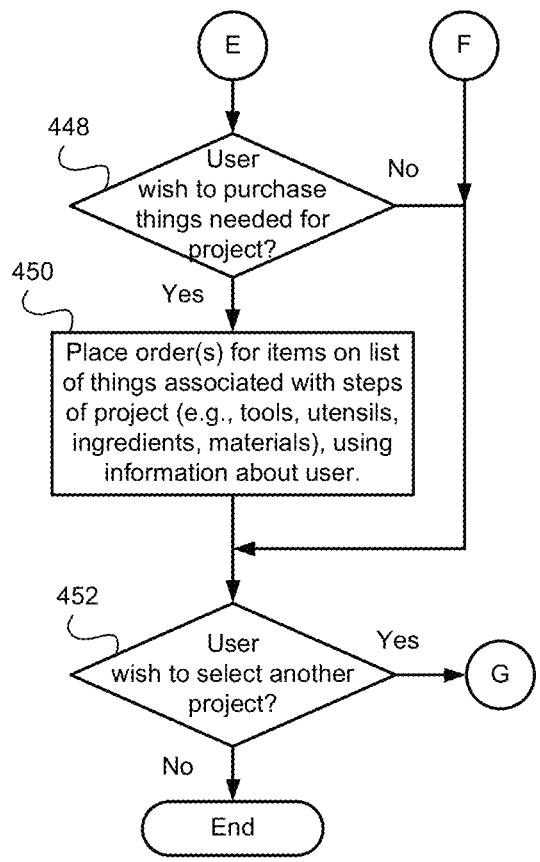

Following display and/or printing of the list of things needed for the selected project, the method may then, at block 448 of FIG. 4D, make a determination as to whether the user wishes to purchase the things needed to complete the selected project. If it is determined, at block 448, that the user does not wish to purchase the things necessary to complete the selected project, the method of FIGS. 4A-4D then proceeds to block 452. If, however, the user has indicated that they do wish to purchase the things needed to complete the selected project, then at block 450, the system performing the method of FIGS. 4A-4D places order(s) for the item(s) on the list of things associated with completing the steps of the selected project, using shipping and payment information previously provided by the user. If no such information is on file on the system performing the method of FIGS. 4A-4D, the system performing the method may request the information needed to complete the purchase and delivery of the things needed for the selected project. The method then proceed to block 452.

At block 452, the method makes a determination as to whether the user wishes to select another project. If the user wishes to select another project, the method proceeds at block 402 of FIG. 4A, described above. If, however, the user chooses not to select another project, the method of FIGS. 4A-4D ends.

Figure 5:
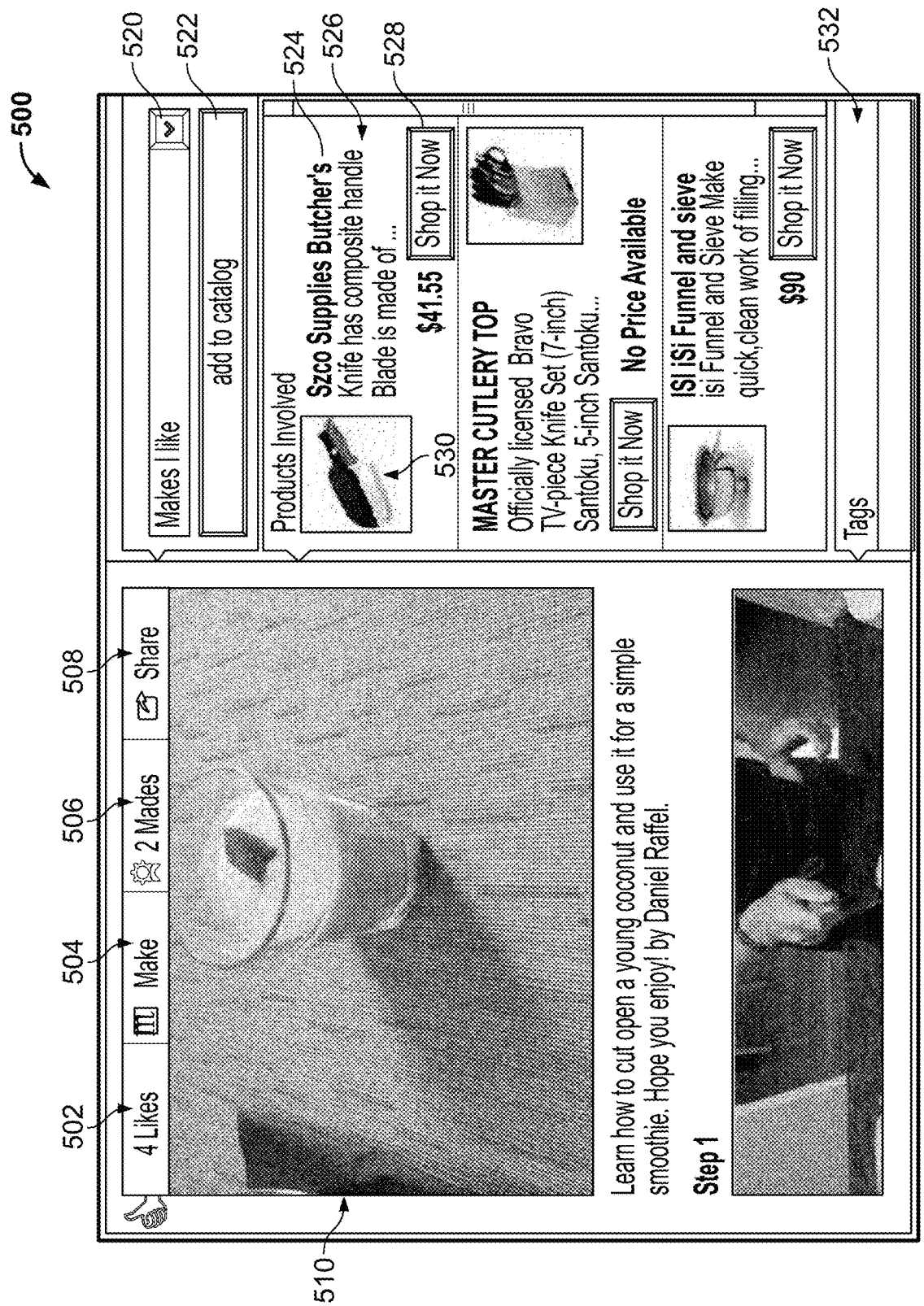
FIG. 5 is an illustration of an exemplary project page that may be generated by a system supporting the assisted creation of media content documenting the details of completing a step-by-step project in an Internet-based, social networking/social e-commerce environment, in accordance with a representative embodiment of the present invention.

FIG. 5 is an illustration of an exemplary project page 500 that may be generated by a system supporting the assisted creation of media content documenting the details of completing a step-by-step project in an Internet-based, social networking/social e-commerce environment, in accordance with a representative embodiment of the present invention. The exemplary project page 500 of FIG. 5 displays an image 510 of the completed project, which in FIG. 5 is identified as a "coconut smoothie." Above the image 510 are shown a "Likes" indicator 502, showing the number of users who have indicated that they "Like" the project; a "Make" user interface element 504, to permit the user to initiate the creation of their own project; a "Mades" indicator, showing the total number of different projects, including the original project and any variations, that are available for viewing; and a "Share" user interface element 508, to permit the user to share a link to the project with others via, by way of example and not limitation, email, social media (e.g., Twitter®), or any other suitable means. FIG. 5 also illustrates a drop-down list of "Makes I like" 520, and an "Add to Catalog" button 522, to permit the user to add a link to the project to a "catalog" of the user. The term "catalog" may be used herein to refer to a collection of things of interest to the user (e.g., products (tools, utensils, ingredients, supplies, and/or materials), comments, pictures, catalogs, and/or projects). A "catalog" may be maintained for a user by elements of a system such as the host system 68 shown in FIG. 1.

The illustration of FIG. 5 also shows information about the things that may be used in completing the illustrated project. For example, the illustration of FIG. 5 shows information sections for three products that may be used in completing the project of FIG. 5. The first product section identifies the brand name 524 of a particular butcher's knife, a description 526 of the named knife, and a "Shop it Now" button 528 that enables the user to purchase the identified knife directly from the project page. The example project page of FIG. 5 also includes a collection of "tags" 532 that users have applied to the project illustrated in FIG. 5. The term "tag" may be used herein to refer to a string of characters applied to, by way of example and not limitation, a project, product, comment, catalog, or other item, that may be used as an identifier for searches, for example.

Figure 6:
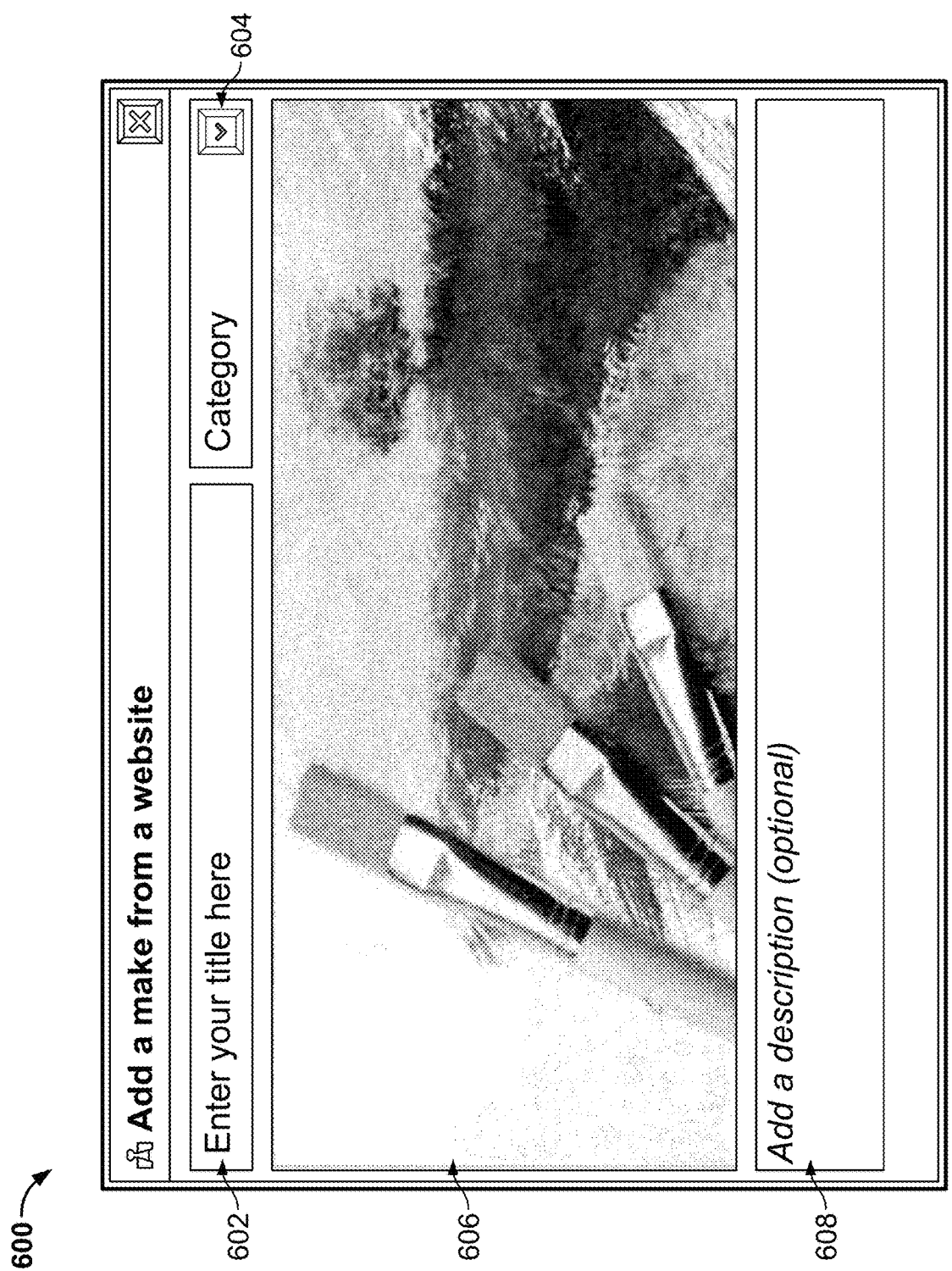
FIG. 6 is an illustration of an exemplary screen image representative of a web page generated by a system supporting the assisted creation of media content documenting the details of completing a step-by-step project in an Internet-based, social networking/social e-commerce environment, in accordance with a representative embodiment of the present invention.

FIG. 6 is an illustration of an exemplary screen image 600 representative of a web page generated by a system supporting the assisted creation of media content documenting the details of completing a step-by-step project in an Internet-based, social networking/social e-commerce environment, in accordance with a representative embodiment of the present invention. The illustration of FIG. 6 shows information that may be displayed to the user after user selection of a user interface element such as the "make" button 504 of FIG. 5, described above. The information displayed to the user includes a project title field 602 for user entry of a project name; a project category list box 604 that may be used to select a category in which the project may be grouped; a project image 606 that may be representative of the category of the project or an image of the outcome the completed project; and a project description field 608 that permits the creator of the project to provide textual information about the project.

Figure 7:
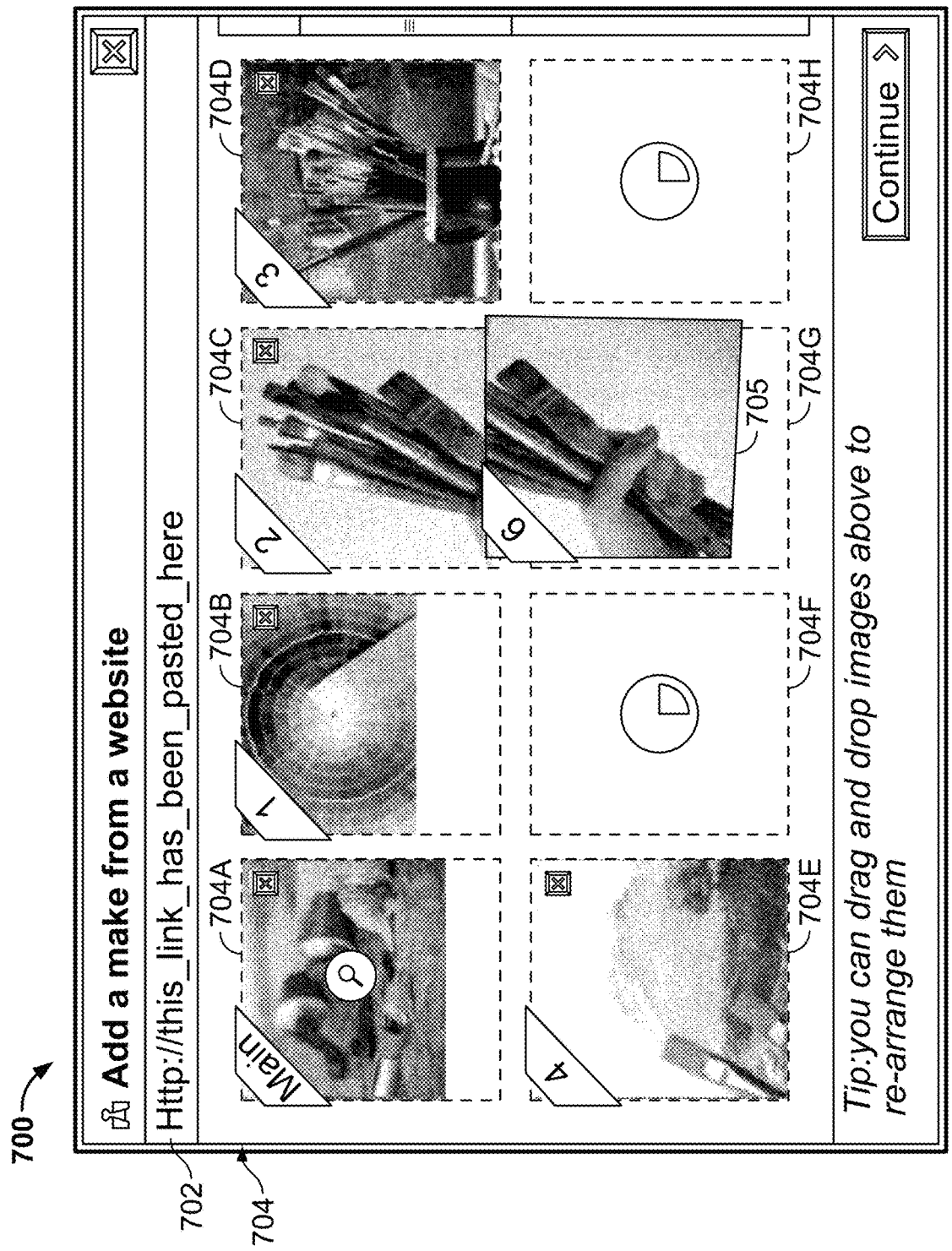
FIG. 7 is an illustration of an exemplary screen image representative of a web page generated by a system supporting the assisted creation of media content documenting the details of completing a step-by-step project in an Internet-based, social networking/social e-commerce environment, in accordance with a representative embodiment of the present invention.

FIG. 7 is an illustration of an exemplary screen image 700 representative of a web page generated by a system supporting the assisted creation of media content documenting the details of completing a step-by-step project in an Internet-based, social networking/social e-commerce environment, in accordance with a representative embodiment of the present invention. The illustration of FIG. 7 shows information that may be displayed to the user (e.g., in a new or pop-up window) to permit user specification of a source of images that may be available for use in the creation of a step-by-step project by the user. The illustration of FIG. 7 includes a source field 702, in which the user may enter information (e.g., a file path, a file folder, or a URL) identifying a location that may be a source of images that are accessed from, by way of example and not limitation, a user device such a personal computer or smart phone, or that are accessible via a network such as, for example, a local network or the Internet. The illustration of FIG. 7 also an image display portion 704, having an exemplary arrangement of cells 704A-704H into which the images for each of the steps of the step-by-step project be positioned. Other arrangements (e.g., a carousel, a flip-book) are also contemplated. Following entry of source information in source field 702, a representative embodiment of the present invention may, as described above with respect to FIGS. 2A-2C and FIGS. 3A-3B, analyze the information accessible at the source location, to collect any images that are available from the source identified by the source field 702. In one exemplary embodiment of the present invention, the images from the source may automatically, by default, be placed in cells 704A-704H in the order in which they are found in the source (e.g., web page, file, or file folder). The user may then re-arrange the images so that the images are in the order of their choice by selecting an image in one of the cells 704A-H, and dragging the image, such as the image 705, to another cell, and dropping it there. A representative embodiment of the present invention may include an indicia on each displayed image representing the placement of the images in the project (e.g., "Main," "1," "2," etc.), as illustrated in the example of FIG. 7. In addition, some of cells 704A-H may indicate by displaying a particular graphic 704F, 704H that searching for images is active and not yet complete.

Figure 8:
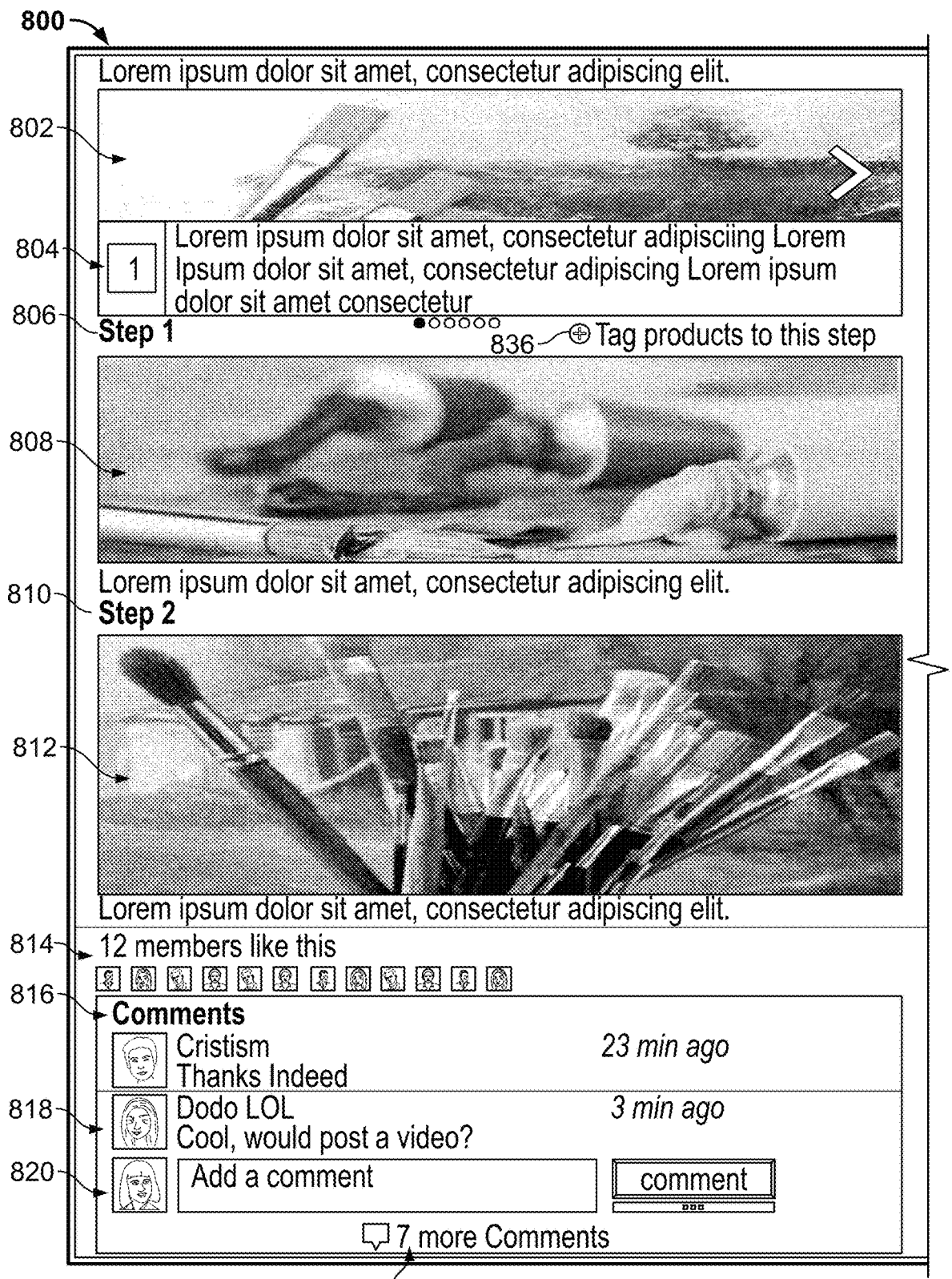
FIG. 8 is an illustration of an exemplary screen image representative of a web page generated by a system supporting the assisted creation of media content documenting the details of completing a step-by-step project in an Internet-based, social networking/social e-commerce environment, in accordance with a representative embodiment of the present invention.
Figure 8:
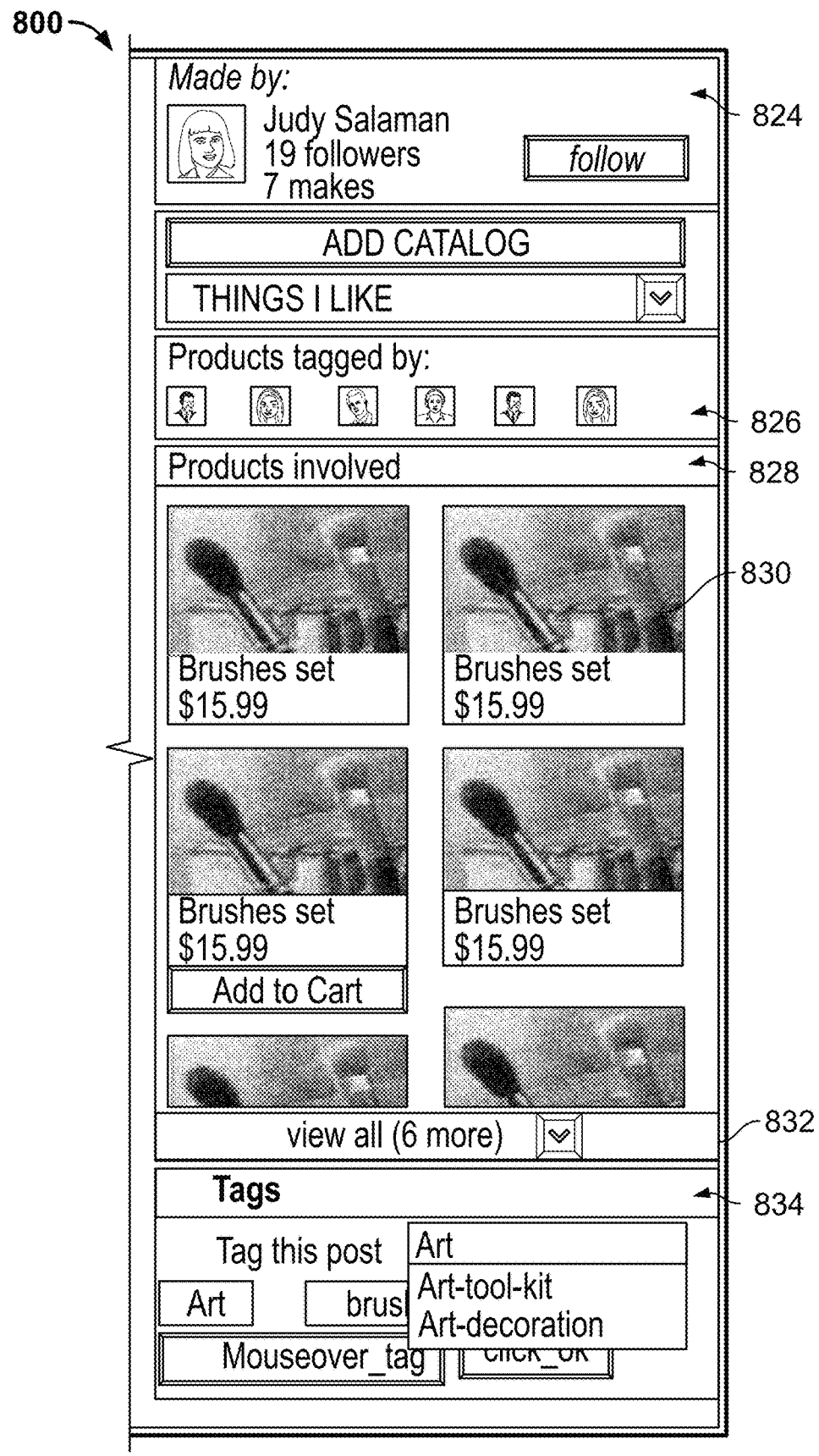

FIG. 8 is an illustration of an exemplary screen image 800 representative of a web page generated by a system supporting the assisted creation of media content documenting the details of completing a step-by-step project in an Internet-based, social networking/social e-commerce environment, in accordance with a representative embodiment of the present invention. The illustration of FIG. 8 shows information that may be displayed to a user viewing a step-by-step project. The illustration of FIG. 8 includes a project image 802 and a project description or summary 804, that may, for example, correspond to the project image 606 and information entered by the project creator into project description field 608, of FIG. 6. The illustration of FIG. 8 also illustrates two project steps 806, 810 with corresponding project step images 808, 812 having respective captions. In addition, the example of FIG. 8 includes a collection of thumbnail images 814 representing the users that have indicated that they "Like" the project of FIG. 8, and comments 816, 818 submitted by two users that accessed the project. FIG. 8 also includes a comment submission portion 820 that includes a thumbnail of the user, a field for entry of comment text, and a "Comment" button to enable the user to submit their own comment about the project of FIG. 8. A user interface element 822 that indicates when there are additional comments available for review, is also provided.

In addition, the illustration of FIG. 8 includes creator information 824, comprising a thumbnail image of the project creator, the name of the project creator, information about the number of followers and "makes" that the creator of the current project has, and a "Follow" button, to permit the user to share in social network messaging from or about the creator of the project. A group of thumbnail images 826 represent users that have "tagged" products shown in one or more steps of the current project. Holding the cursor momentarily over one of the thumbnail images 826 for a particular individual, referred to herein as a "mouse-over," may initiate the display of a pop-up window containing a larger image of that individual, along with details about that individual including, for example, the number of projects or "makes" that the individual has submitted, the number of users "following" that individual, and a selectable button used to request that the user viewing the project be added as a "follower" of that individual.

The illustration of FIG. 8 also illustrates a collection of product images and information 828 for the various things or products (e.g., utensils, tools, materials, ingredients, and/or supplies) used in the project of FIG. 8 are shown, such as product information 830. In a representative embodiment of the present invention, the image and information for any of the illustrated things or products may be accompanied by a user interface element such as a "button" or "link" that permits the user viewing the project to immediately add the illustrated product for the project, to their shopping cart for later purchase. If more things or products are used in the project than can be displayed by the allotted portion of the screen of the user device, the user viewing the project can scroll/expand the portion of FIG. 8 to show the remaining things/products used in the project, by selecting a user interface element 832. Further, the user may add their own "tag" to the project, by entering a string of characters of their choice at tag field 834. In addition to the above, FIG. 8 illustrates a "tag products in this step" user interface element 836, which can be selected/clicked by the user viewing the steps of the project, to permit the user to add information about an object or thing in the image (e.g., a product such as a utensil, a tool, an ingredient, a material, or a supply). In a representative embodiment of the present invention, the user may first click on/select the user interface element 836, and may then select the location on the project step image at which the object or thing of interest appears. Selection of the object/thing in the project step image causes a marker or "tag" to appear at the selected location in the project step image, to identify the "tagged" object. A project search window may then be displayed, as described below.

Following selection of a product, information about the product selected by the user may be associated with the project and with the user that selected the product. Information identifying the products selected by various users for the steps of the project may be displayed to the users such as, for example, by way of a collection of product images and information, shown in FIG. 8 as the collection of product images and information 828, and an image of the user that tagged the object or thing in the project step image and identified a product choice, may be displayed, such as in the group of thumbnail images 826 of FIG. 8. In a representative embodiment of the present invention, users following a given project may be notified of the tagging of project images, to enable those following to keep abreast of the development of variations and alternatives for a project of interest to them, as just one aspect of the social nature of the present invention. Moreover, those other users, viewing the products identified for the tagged objects or things in the project step image may add comments, or may choose to add their own product choices or suggestions, increasing engagement of users in the various projects maintained on the system. In addition, a representative embodiment of the present invention may monitor, record, and rank user choices of various products, and such information may be made available to users when selecting products for projects.

Figure 9:
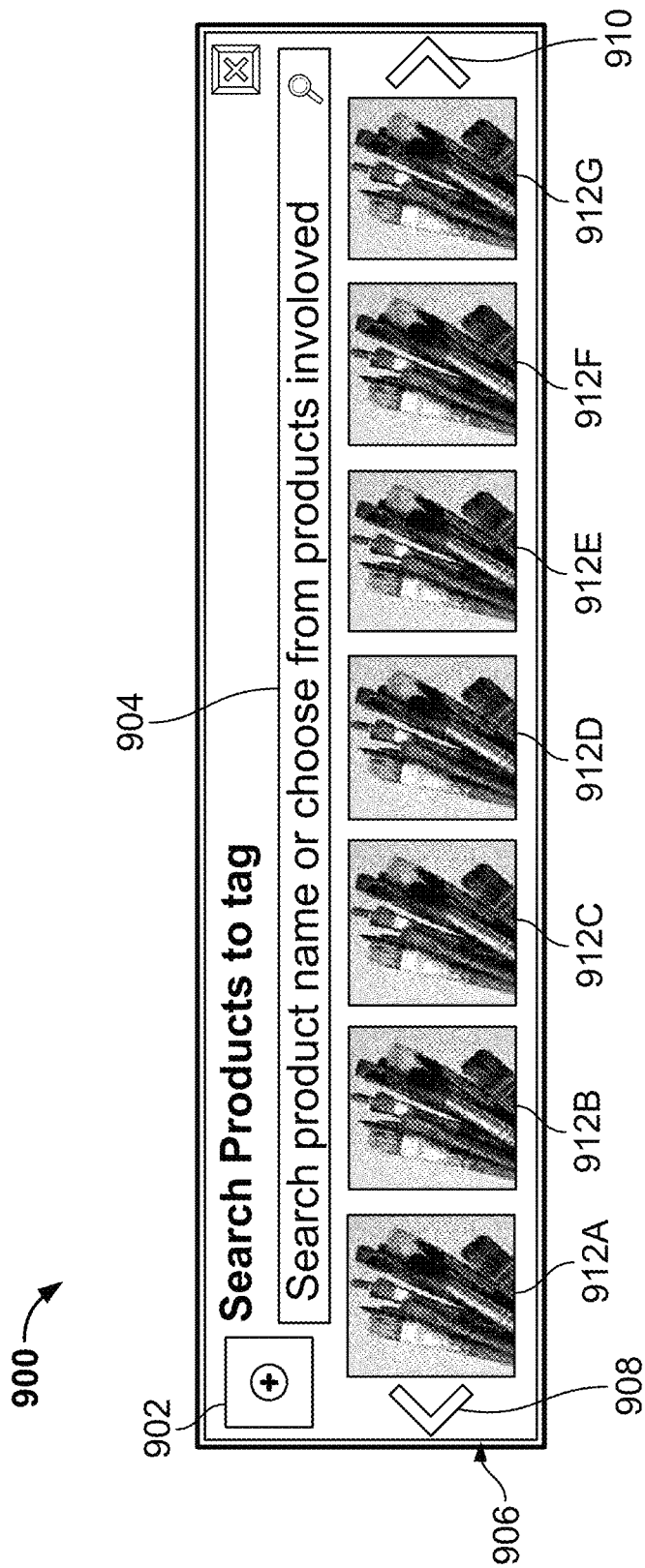
FIG. 9 shows an illustration of an exemplary product search window that may be used to search for suitable products used to tag an object or thing in an image of a project step, in accordance with a representative embodiment of the present invention.

FIG. 9 shows an illustration of an exemplary product search window 900 that may be used to search for suitable products used to tag an object or thing in an image of a project step, in accordance with a representative embodiment of the present invention. The product search window 900 may appear following user selection of, for example, a user interface element such as the "tag products to step" user interface element 836 of FIG. 8. The example product search window 900 illustrated in FIG. 9 shows an image portion 902, which may, for example, be a portion of the image for the project step (e.g., project step image 808) in which the object or thing selected by the user appears. The user may enter terms in the search box 904 that are to be used as search keys in identifying one or more suitable products that may be identified as the object or things tagged by the user in the project step image. In some representative embodiments of the present invention, a means of display such as, for example, the carousel 906 may be used to display images 912A-912G that represent the products identified by the search. In such an embodiment, the user may use left and right arrows 908, 910 to scroll through the carousel, and may click on or select one of the images 912A-912G, to identify the actual object or thing (e.g., utensil, tool, ingredient, material, or supply) that the user may have used for the project, has chosen to use, or is recommending for use for the identified object or thing that they tagged in the project step image. It should be noted that although a carousel is illustrated in FIG. 9, other means of displaying the results of the product search such as, by way of example and not limitation, a list of search results or a grid arrangement showing pictures and/or other information for each product may also be used, without departing from the spirit of the present invention.

Figure 10:
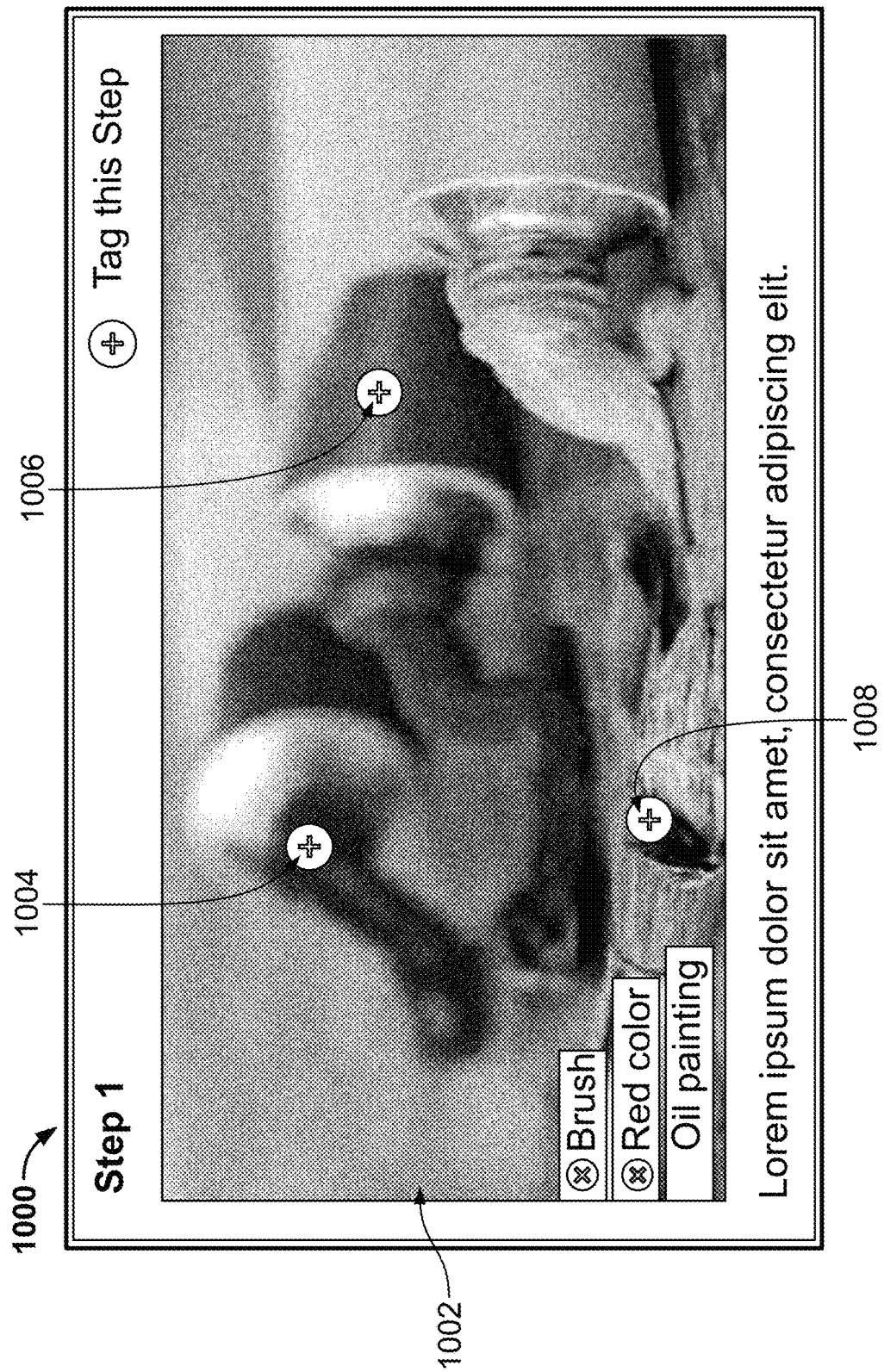
FIG. 10 is an illustration of an exemplary project step with project step image 1002, in which things in the project step image have been "tagged" by a user in order to associate one or more particular characteristics of the tagged thing with the portion of the image that represents the thing, in accordance with a representative embodiment of the present invention.

FIG. 10 is an illustration of an exemplary project step 1000 with project step image 1002, in which things in the project step image 1002 have been "tagged" by a user in order to associate one or more particular characteristics of the tagged thing with the portion of the image that represents the thing, in accordance with a representative embodiment of the present invention. The illustration of FIG. 10 includes a marker for a first tag 1004 associated with a first tube of paint, a marker for a second tag 1006 associated with a second tube of paint, and a marker for a third tag 1008 associated with a brush. In a representative embodiment of the present invention, tags such as the tags 1004, 1006, 1008 in the project step image 1002 of FIG. 10 may be associated with a step of a step-by-step project, with a variation of a step of a step-by-step project, and/or with a user that added the tags to an image, and may be stored in a manner (e.g., in association with the project step or project step variation to which they were applied and the user that applied them) such that information associated with tags in project step images may be associated with the particular user that added the tag and the information, which may be retrieved using the tag. In a representative embodiment of the present invention, a user may tag an item in an image for a project step by, for example, selecting a user interface element such as, for example, the user interface element 836 illustrated in FIG. 8, and then identifying the desired portion of the image to be tagged.

In some representative embodiments of the present invention, the tags may include, or be stored in association with, information that identifies one or more characteristics of the tagged thing in the image. Such identifying information may, for example, be provided entirely by the user adding the tag using manual entry, or such information may, for example, be captured/selected from the results produced by user searches for similar things found in merchant or manufacturer catalogs or databases, or searches of other information sources accessible via the Internet. Such information may include, by way of illustration and not limitation, a category of the tagged thing (e.g., tool, utensil, ingredient, material, or supply); a source from which the tagged thing may be acquired; a manufacturer of the tagged thing; a cost of the tagged thing; one or more chemical or nutritional properties of the tagged thing; a color identifier; a style identifier; a model; a material identifier; a proprietary identifier; a stock keeping unit (SKU); an item number; a URL, and/or a Universal Product Code (UPC).

Figure 11:
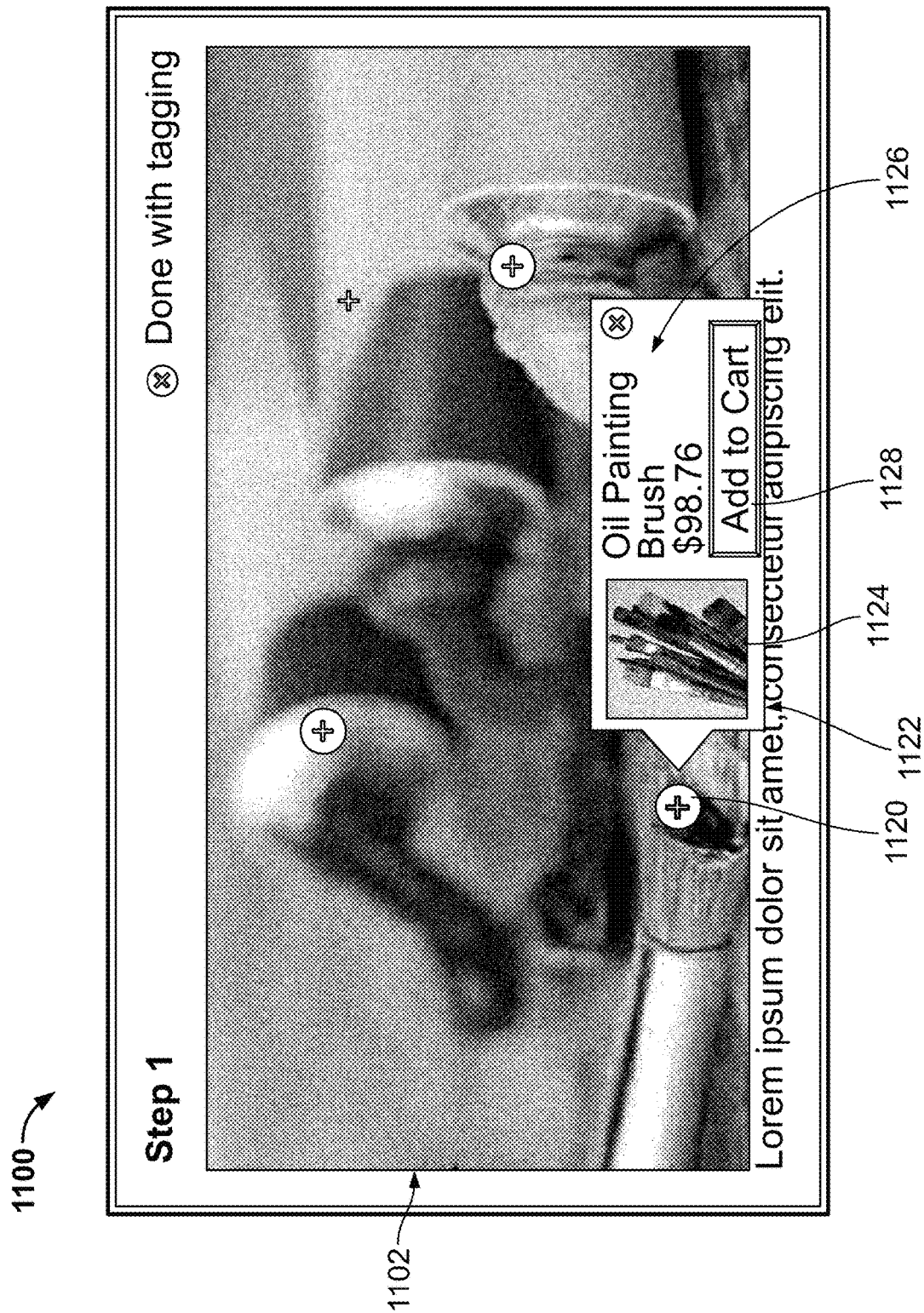
FIG. 11 is an illustration of an exemplary project step, which may correspond to, for example, the exemplary project step of FIG. 10, in which a user hovers a cursor over a marker indicating a tagged thing in a project step image, resulting in the display of a pop-up window containing information associated with the tagged thing of the marker, in accordance with a representative embodiment of the present invention.

FIG. 11 is an illustration of an exemplary project step 1100, which may correspond to, for example, the exemplary project step 1000 of FIG. 10, in which a user hovers a cursor over a marker 1120 indicating a tagged thing in a project step image 1102, resulting in the display of a pop-up window 1122 containing information associated with the tagged thing of the marker 1120, in accordance with a representative embodiment of the present invention. The pop-up window 1122 illustrated in FIG. 11 includes an image 1124 representing a product that may, for example, be used and/or recommended by the user that tagged the thing identified by the marker 1120, and such actions for use, in part, for notifying other users of, for example, their product selection, and the project for which the product for which the product was selected. Such a system may also use such information to provide information showing the ranking of the products selected for the project and/or project step(s).

Figure 12:
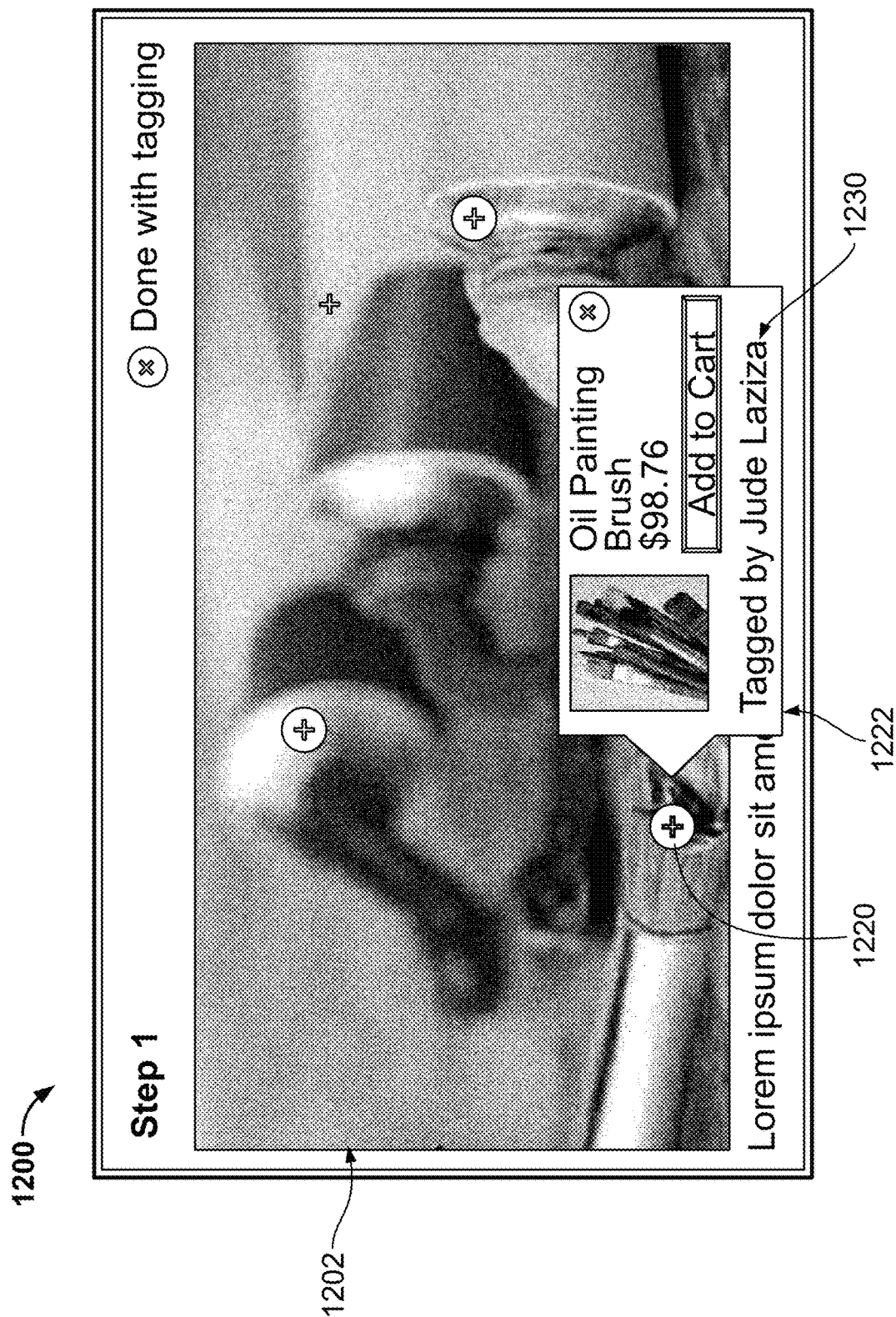
FIG. 12 is an illustration of another exemplary project step, which may correspond to, for example, the exemplary project steps of FIGS. 10 and 11, in which a user hovers a cursor over a marker indicating a tagged thing in a project step image, resulting in the display of a pop-up window containing information associated with the tagged thing of the marker, in accordance with a representative embodiment of the present invention.

FIG. 12 is an illustration of another exemplary project step 1200, which may correspond to, for example, the exemplary project steps 1000, 1100 of FIGS. 10 and 11, in which a user hovers a cursor over a marker 1220 indicating a tagged thing in a project step image 1202, resulting in the display of a pop-up window 1222 containing information associated with the tagged thing of the marker 1220, in accordance with a representative embodiment of the present invention. The pop-up window 1222 illustrated in FIG. 12 contains information similar to that of the pop-up window 1122, and in addition, includes information identifying the user that placed the marker 1220, and identified a suitable product for the tagged thing, in the project step image 1202.

Figure 13:
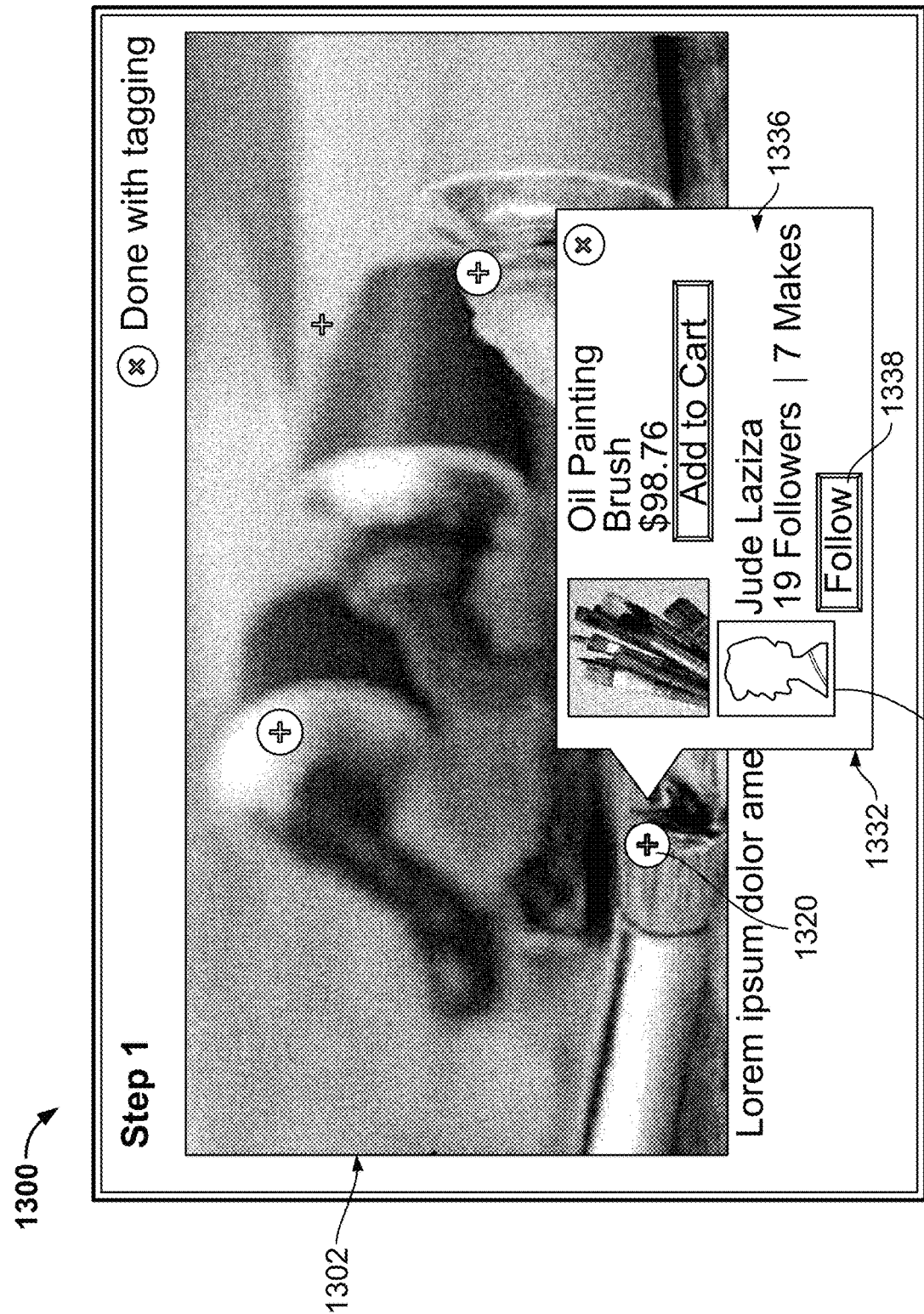
FIG. 13 is an illustration of yet another exemplary project step, which may correspond to, for example, the exemplary project steps of FIGS. 10, 11, and 12, in which a user hovers a cursor over a marker indicating a tagged thing in a project step image, resulting in the display of a pop-up window containing information associated with the tagged thing of the marker, in accordance with a representative embodiment of the present invention.

FIG. 13 is an illustration of yet another exemplary project step 1300, which may correspond to, for example, the exemplary project steps 1000, 1100, 1200 of FIGS. 10, 11, and 12, in which a user hovers a cursor over a marker 1320 indicating a tagged thing in a project step image 1302, resulting in the display of a pop-up window 1332 containing information associated with the tagged thing of the marker 1320, in accordance with a representative embodiment of the present invention. The pop-up window 1332 illustrated in FIG. 13 contains information similar to that of the pop-up windows 1122, 1222 and in addition, includes more details identifying the user that placed the marker 1320, and identified a suitable product for the tagged thing, in the project step image 1302. The example of FIG. 13 includes an image of the user that tagged the thing by placing the marker 1320; information including the name of the tagging user 1336, the number of users "following" the name user, and the number of "makes" or projects submitted by the named tagging user. In addition, the example pop-up window 1332 includes a "Follow" user interface element 1338, to permit a user viewing the project to request that be notified of actions by the named user such as, by way of example and not limitation, tagging of project images, creation of projects, and commenting on projects, project steps, and/or products.

Figure 14:
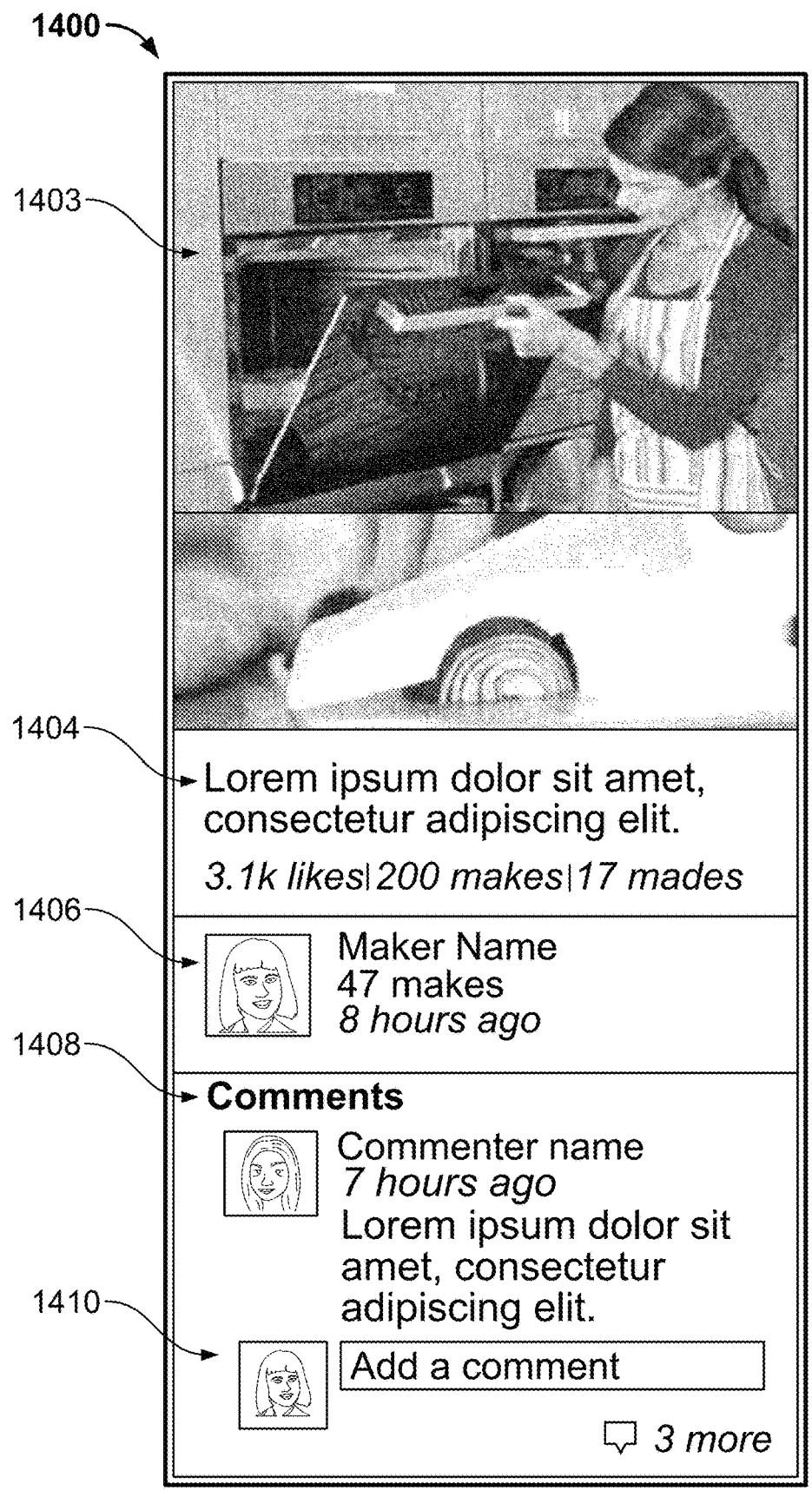
FIG. 14 shows an illustration of an exemplary project view, in accordance with a representative embodiment of the present invention.

FIG. 14 shows an illustration of an exemplary project view 1400, in accordance with a representative embodiment of the present invention. The project view 1400 shows a project image 1403, a project description section 1404, a maker information section 1406, and a comments section 1408. The project image 1403 may include, for example, an image representative of the associated project such as, by way of example and not limitation, a picture of the finished result, or a collage of one or more images from the steps of the project. The project description section 1404 may include a textual description of the project, the popularity of the project (e.g., a number of "Likes," or the number of individuals following the project), and the number of users that have made the project. The maker information section 1406 may include, for example, an image of the creator (i.e., the "maker"), the total number of projects created by the creator of this project, and how long ago this project was made available for viewing by others. The comments section 1408 may include, for example, a one or more user comments, where each comment is accompanied by information about the user posting the comment, and how long ago the comment was posted. The comments section 1408 may also include an image of the user viewing the project and a text window for entry of a comment by the viewer.

In a representative embodiment of the present invention, each project contributor or "maker" may have their own page of projects comprised of one or more project views such as, for example, the project view 1400 described above. A user viewing such a projects page may select any of the project views, upon which full details of the project represented by the project view are then displayed.

Figure 15:
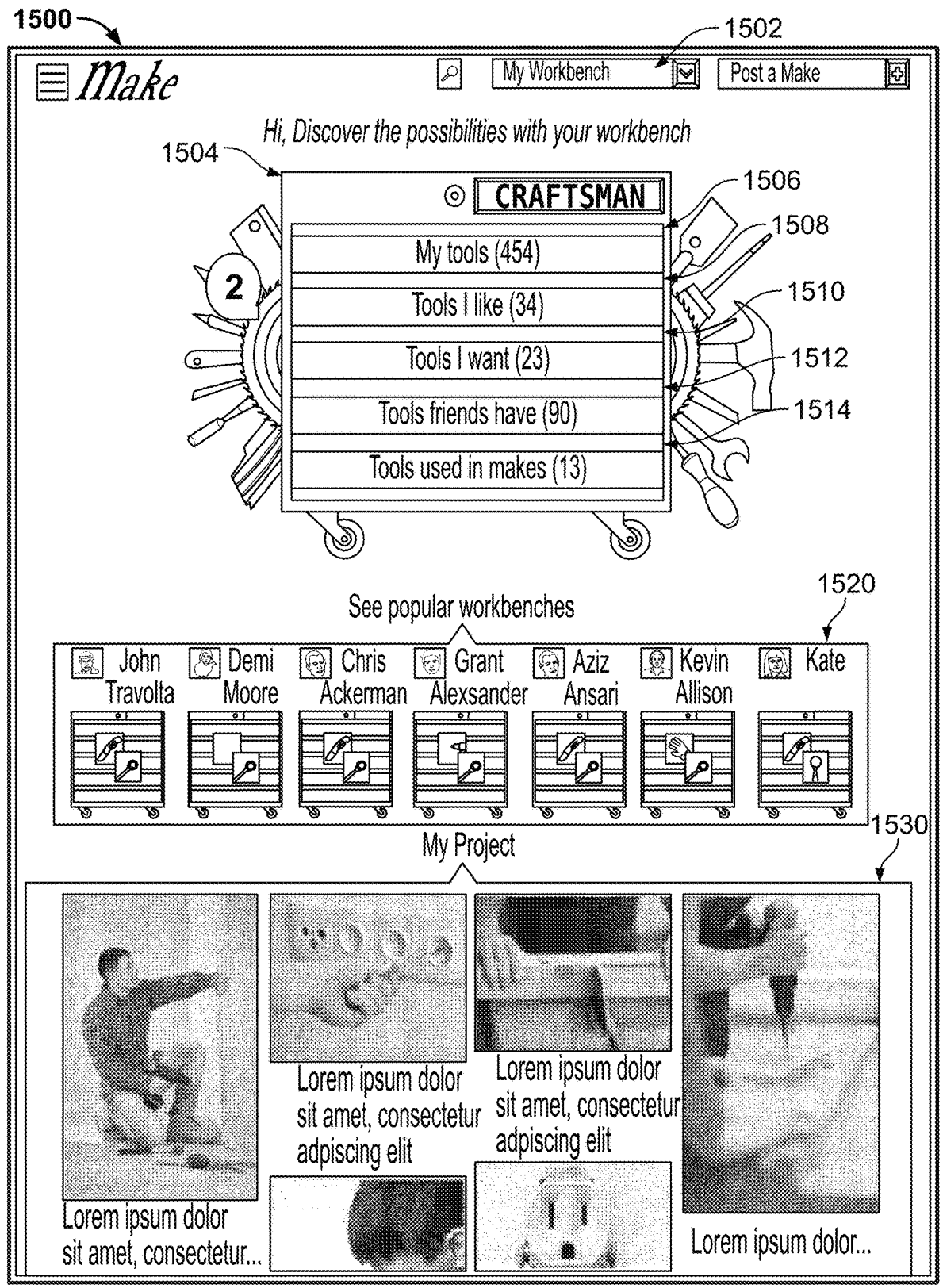
FIG. 15 shows an exemplary screen image illustrating a digital workbench that may be generated by a system supporting the assisted creation of media content documenting the details of completing a step-by-step project in an Internet-based, social networking/social e-commerce environment, in accordance with a representative embodiment of the present invention.

FIG. 15 shows an exemplary screen image 1500 illustrating a digital workbench that may be generated by a system supporting the assisted creation of content documenting the details of completing a step-by-step project in an Internet-based, social networking/social e-commerce environment, in accordance with a representative embodiment of the present invention. The illustration of FIG. 15 includes an interactive image of a "workbench" 1504 having multiple drawers "My Tools" 1506, "Tools I Like" 1508, "Tools I Want" 1510, "Tools Friends Have" 1512, and "Tools Used In Makes" 1514, containing various collections of tools. Clicking on/selecting any of the drawers 1506, 1508, 1510, 1512, 1514 causes the display of the contents of the respective drawer, described below. The user may select the active "workbench" from a collection of workbenches, using the drop down list 1502. The contents of a particular drawer of the selected workbench may be displayed when the drawer (e.g., drawers 1506, 1508, 1510, 1512, 1514) are selected/clicked-on. The active "workbench" may include, by way of example and not limitation, the "workbench" of a friend, the "workbench" of a celebrity (e.g., a particular NASCAR driver, a well-known woodworker or mechanic, or recognized artist), or any of one or more "workbenches" provided by the merchant operating or sponsoring the e-commerce platform supporting the creation of projects. In a representative embodiment of the present invention, various "workbenches" may be recommended to the user, based on the popularity of tools in the workbench, the popularity of the "owner" of the "workbench," or the interests of the user. The interests of the user may be determined, by way of example and not limitation, from product searches or purchases made by the user, from information about individuals with which the user communicates (e.g., an individual in a social network of which the user is owner or participant), or by information gathered from the user through various means of self-identification (e.g., response to questions sent to the user, click-through on advertisements of products, mailing lists).

The tools represented in the drawer labeled "My Tools" 1506 may, for example, be explicitly added to the drawer by the user (e.g., for tools owned by the user prior to their engagement with the system of the present invention), or may be automatically added when a new tool is purchased by the user such as, for example, as part of a project, or otherwise. The tools represented in the drawer labeled "Tools I Like" 1508 may, for example, be added to the drawer whenever a user "Likes" a tool by, for example, selecting/clicking on a "Like" icon at an e-commerce web site of the merchant that operates or sponsors the system, or another merchant that participates with the operator/sponsor of the system (e.g., the host system 68 of FIG. 1). In a similar fashion, tools represented in the drawer labeled "Tools I Want" 1510 may, for example, be added to the drawer whenever a user indicates that they "Want" a tool by, for example, selecting/clicking on a "Want" icon, while at an e-commerce web site that participates with the operator/sponsor of the system supporting the embodiment of the present invention producing the information representing the screen image.

The tools represented in the drawer labeled "Tools Friends Have" 1512 may, for example, be explicitly added to the drawer by the user, for tools that the user knows are owned by friends of the user, may be automatically added based on tools owned or purchased by friends that the user "Follows," or may be automatically added when a friend of the user chooses to enable sharing of the contents of their own "workbench" with the user. Finally, tools may be added to the drawer labeled "Tools Used In Makes" 1514 based on, for example, projects or "makes" that the user has requested to "Follow," based on projects or "makes" that the user has completed, or based on completion of projects by friends that the user has requested to "Follow."

The illustration of FIG. 15 also shows a collection of "workbenches" 1520 that are identified as being associated with other individuals. The user may explore the "workbenches" 1520, and may, for example, choose to "Want" or "Like" tools from the "workbenches" of the identified individuals, which may then be added to the drawers labeled "Tools I Want" 1510 and "Tools I Like" 1508, respectively, of the "workbenches" 1504 of the user. The illustration of FIG. 15 also includes a portion of the page, "My Projects" 1530, in which project information for various projects of the user may be displayed.

Figure 16:
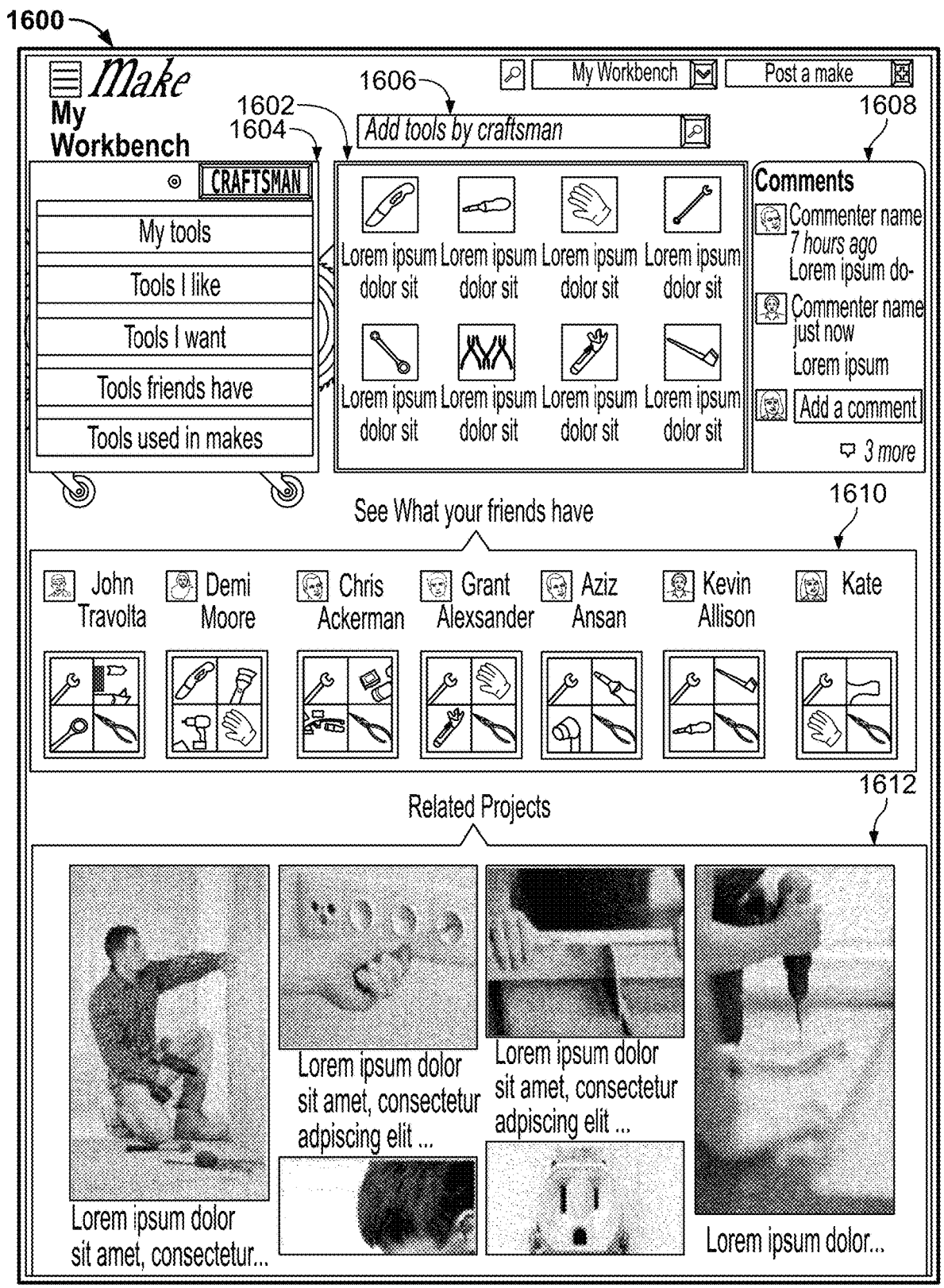
FIG. 16 shows an exemplary screen image illustrating a digital workbench that may be generated by a system supporting the assisted creation of media content documenting the details of completing a step-by-step project in an Internet-based, social networking/social e-commerce environment, in accordance with a representative embodiment of the present invention.

FIG. 16 shows an exemplary screen image 1600 illustrating a digital workbench that may be generated by a system supporting the assisted creation of content documenting the details of completing a step-by-step project in an Internet-based, social networking/social e-commerce environment, in accordance with a representative embodiment of the present invention. The illustration of FIG. 16 includes an interactive image of a "workbench" 1604 that may correspond to the "workbench" 1504 of FIG. 15, and which has drawers "My Tools," "Tools I Like," "Tools I Want," "Tools Friends Have," and "Tools Used In Makes," similar to those of FIG. 15. As shown in FIG. 16, clicking on/selecting any of the drawers of the "workbench" 1604 may display a "pegboard" 1602, with details for each of the tools in the selected drawer. A suitable indication of which drawer is currently selected may be displayed such as, for example, a text label indicating the name of the selected drawer, or highlighting or outlining of the face of the selected drawer. The illustration of FIG. 16 also includes a search bar 1606 that permits the user to search for a desired tool in, for example, a catalog or inventory of tools offered by the merchant operating or sponsoring the system, or in any other suitable information source. A section displaying user comments 1608 about the various tools displayed on the "pegboard" 1602 or on the currently displayed "workbench" 1602 may be reviewed, as well as the images representing pegboards showing some of the contents of the "workbenches" of a collection of various other individuals 1610. In addition, FIG. 16 illustrates a screen portion 1612 in which information for various projects that involve the use of any of the various tools in the drawers of the "workbench" 1604, or the "workbenches" of those in the collection of individuals 1610, may be displayed.

Figure 17:
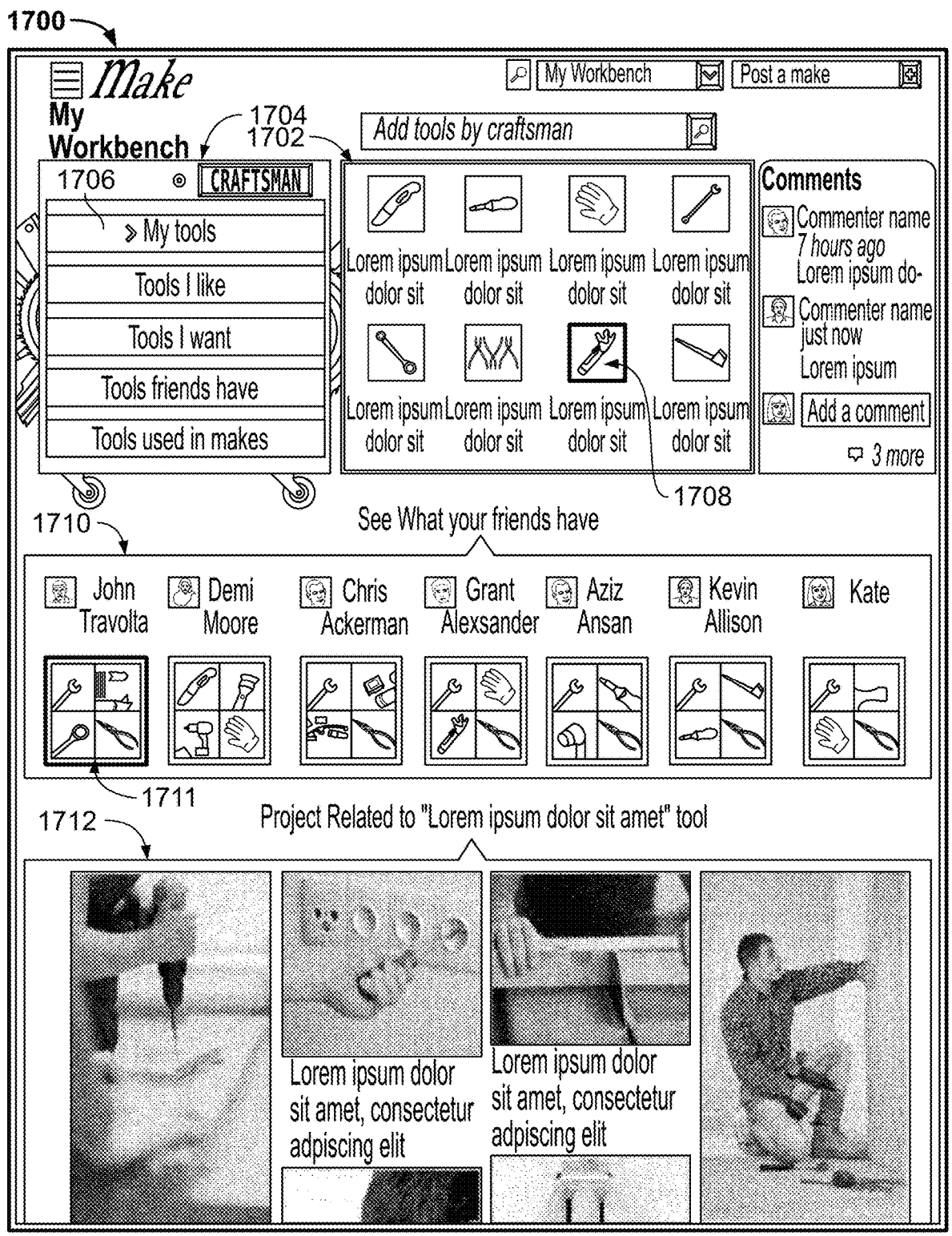
FIG. 17 shows another exemplary screen image illustrating a digital workbench that may be generated by a system supporting the assisted creation of media content documenting the details of completing a step-by-step project in an Internet-based, social networking/social e-commerce environment, in accordance with a representative embodiment of the present invention.

FIG. 17 shows another exemplary screen image 1700 illustrating a digital workbench that may be generated by a system supporting the assisted creation of content documenting the details of completing a step-by-step project in an Internet-based, social networking/social e-commerce environment, in accordance with a representative embodiment of the present invention. The illustration of FIG. 17 includes an interactive image of a "workbench" 1704 that may correspond to the "workbenches" 1504, 1604 of FIGS. 15 and 16, and which has drawers "My Tools," "Tools I Like," "Tools I Want," "Tools Friends Have," and "Tools Used In Makes," similar to those of FIG. 16. As shown by the presence of an indicia (i.e., ">") on the face of the "My Tools" drawer 1706, the "My Tools" drawer 1706 has been selected by the user. As described above, the selection of the "My Tools" drawer 1706 result in the "pegboard" 1702 displaying an image and information each of the tools in the "My Tools" drawer 1706. If the "My Tools" drawer 1706 contains more tools that can be displayed on the "pegboard" 1702, the user may scroll the tools shown on the "pegboard" 1702 to enable viewing of all tools from the selected drawer. One particular tool 1708 is highlighted to show that the tool 1708 has been selected by the user. The illustration of FIG. 17 also shows images of tolls from the "pegboards" of a collection of various identified individuals 1710, similar to that in FIG. 16. In the illustration of FIG. 17, the image 1711 representing some of the tools from the "workbench" of celebrity "John Travolta," is highlighted, indicating that the user has placed the cursor over that particular image (i.e., "moused-over"). User selection of the highlighted image 1711 may cause the "workbench" 1704 to be updated from "My Workbench" to display the "workbench" of the individual represented by the highlighted image 1711, namely, in the example of FIG. 17, the "workbench" of "John Travolta." In addition, FIG. 17 illustrates a screen portion 1712 in which information for various projects that involve the use of the selected tool 1708 in the "pegboard" 1702, may be displayed.

Figure 18:
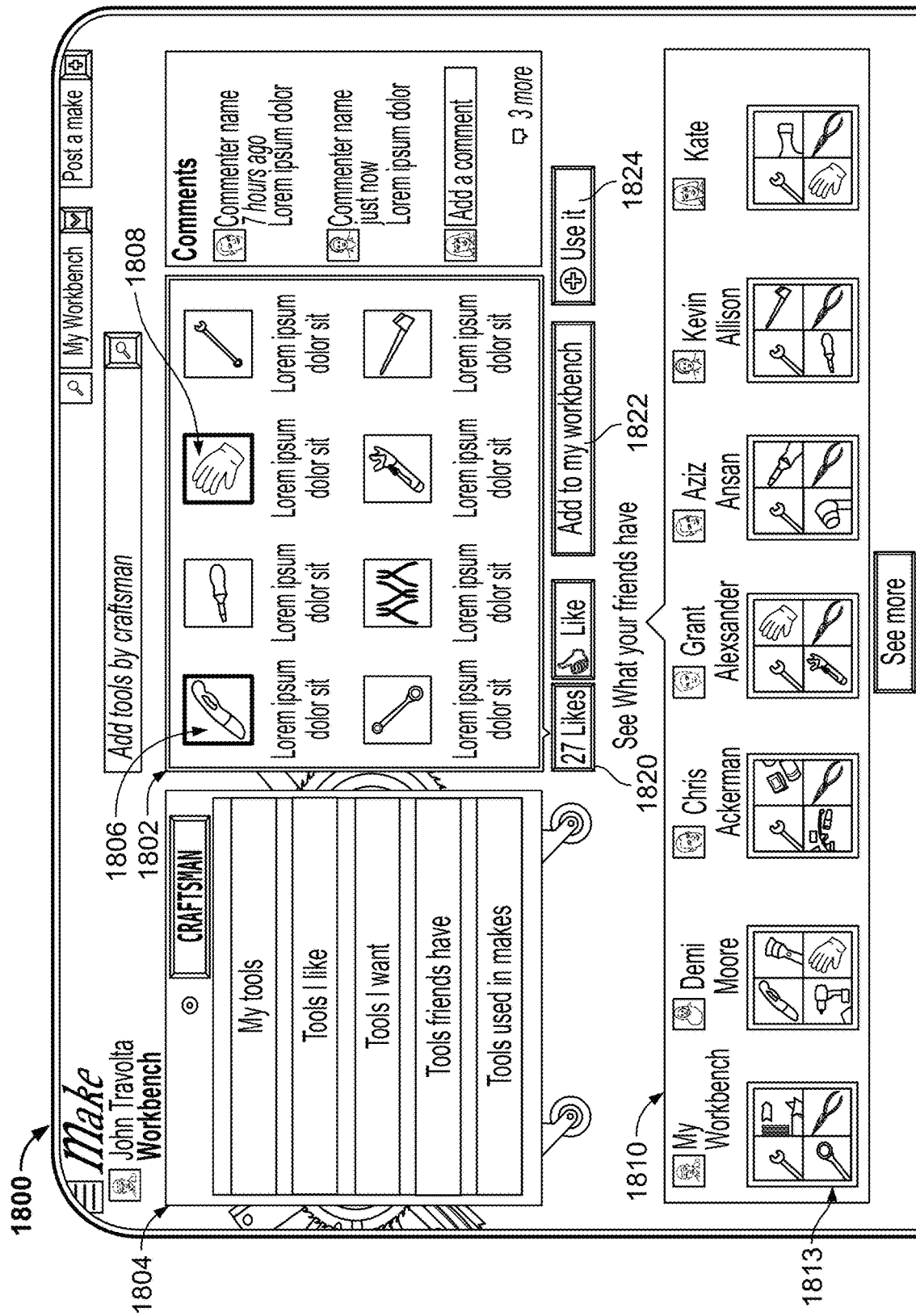
FIG. 18 shows an exemplary screen image illustrating a digital workbench that may be generated by a system supporting the assisted creation of media content documenting the details of completing a step-by-step project in an Internet-based, social networking/social e-commerce environment, in accordance with a representative embodiment of the present invention.

FIG. 18 shows an exemplary screen image 1800 illustrating a digital workbench that may be generated by a system supporting the assisted creation of content documenting the details of completing a step-by-step project in an Internet-based, social networking/social e-commerce environment, in accordance with a representative embodiment of the present invention. In the illustration of FIG. 18, the "workbench" 1804 is now identified as being associated with "John Travolta," following the user selection of, for example, the "pegboards" of "John Travolta" in the collection of various identified individuals 1710 shown in FIG. 17. In addition, the "workbench" of the user (i.e., "My Workbench") is now shown as image 1813 in the collection of individuals 1810, replacing the "workbench" 1711 of "John Travolta" that was shown in FIG. 17 as part of the collection of individuals 1710.

The illustration of FIG. 18 shows a number of tools on the "pegboard" 1802 from the "workbench" 1804, including two tools 1806, 1808 having highlighted outlines, signifying selection of those tools by the user. Following selection of tools on the "pegboard" 1802 of "John Travolta's workbench" 1804, the user may select/click-on the "Add to my workbench" user interface element 1822, to have the selected tools 1806, 1808 added to the collection of tools in the user's own "workbench." The act of adding the selected tools 1806, 1808 to the user's "workbench" may, for example, be tracked or recorded by a representative embodiment of the present invention, to determine interest of the user, or user's in general, in the selected tools 1806, 1808. Such information may be used, for example, for the generation of rankings of tools by user interest, or for future use in targeting advertising or promotions, for notice to the user of projects using the selected tools 1806, 1808, and for sharing with members of the user's social network. The user may also select/click-on the "Use It" user interface element 1824, to begin the creation of a project using the selected tools 1806, 1808, as discussed below with respect to FIG. 20. In a representative embodiment of the present invention, the act of beginning creation of a project may, for example, also be shared via with members of the social network of the user. As shown in FIG. 18, a user interface element 1820 may be present, to make the user aware of number of users that have "Liked" the selected tools 1806, 1808 on the "pegboard" 1802, and to permit viewing of images of those users.

Figure 19:
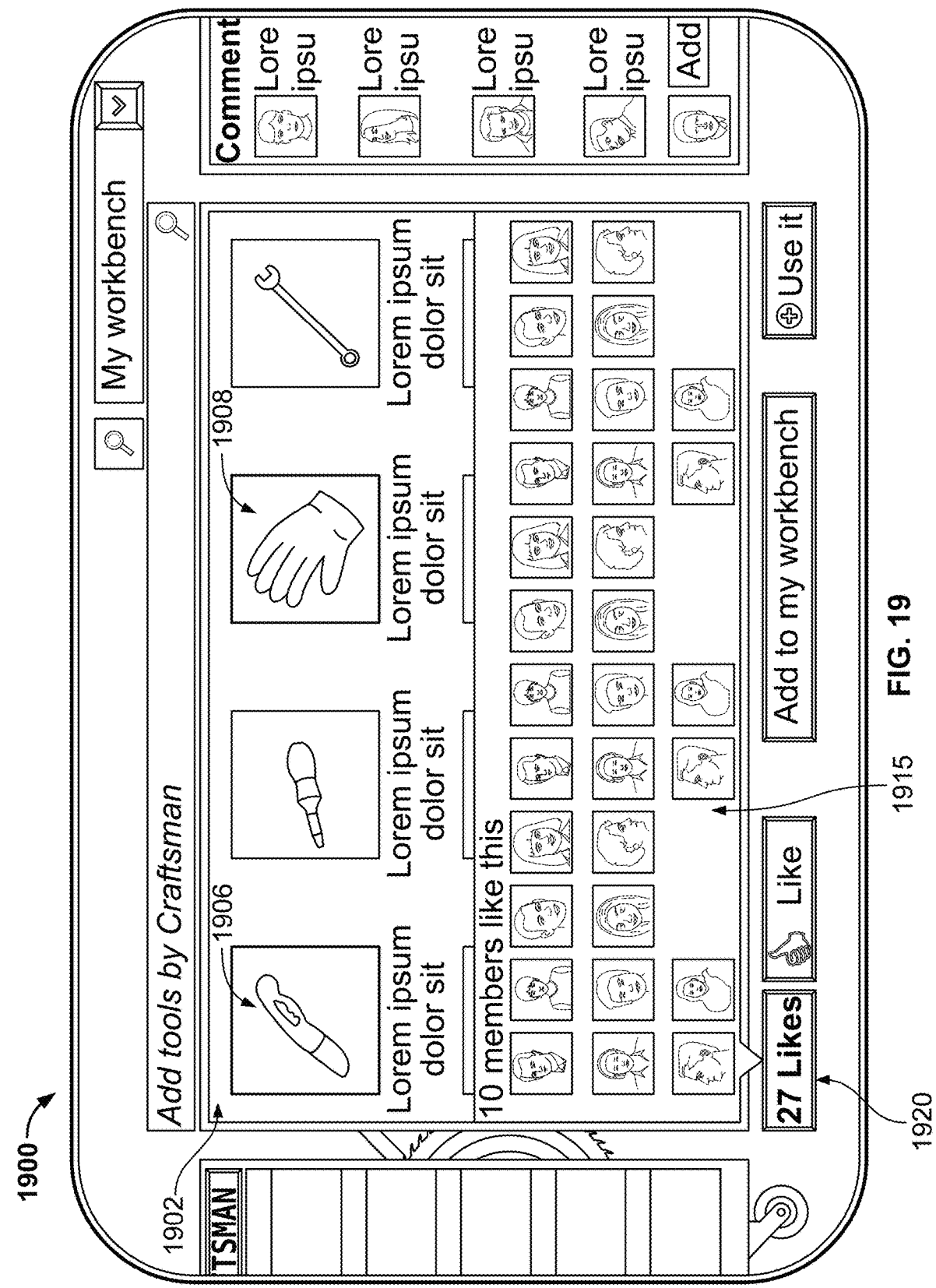
FIG. 19 shows an exemplary screen image illustrating some of the social aspects of that may be shown in screen content generated by a system supporting the assisted creation of media content documenting the details of completing a step-by-step project in an Internet-based, social networking/social e-commerce environment, in accordance with a representative embodiment of the present invention.

FIG. 19 shows an exemplary screen image 1900 illustrating some of the social aspects of that may be shown in screen content generated by a system supporting the assisted creation of media content documenting the details of completing a step-by-step project in an Internet-based, social networking/social e-commerce environment, in accordance with a representative embodiment of the present invention. In the illustration of FIG. 19, the "pegboard" 1902, which may correspond to, for example, the "pegboard 1802" of FIG. 18, is shown as having two tools 1906, 1908 with highlighted borders, indicating user selection of those tools. The illustration also shows user selection of a "Likes" button 1920, which results in the display of a pop-up window 1915 containing thumbnail images of the users that have indicated that they "Like" the selected tools 1906, 1908 shown on the "pegboard" 1902. In a representative embodiment of the present invention, selecting/clicking-on any of the thumbnail images in the pop-up window 1915 make cause display of information identifying the corresponding user that "Liked" the selected tools 1906, 1908.

Figure 20:
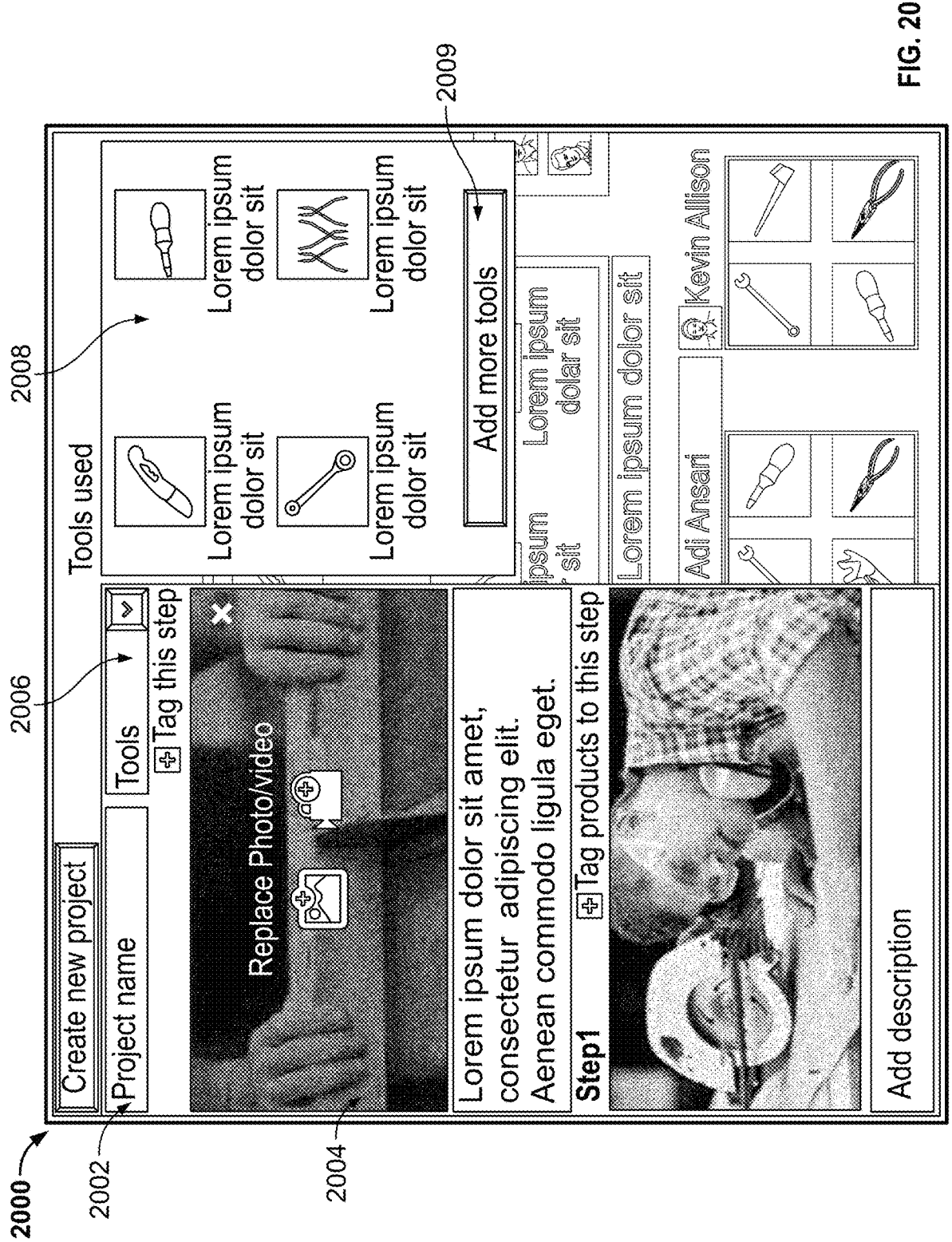
FIG. 20 shows exemplary screen image of an approach to guiding a user in creating a new project involving particular tools using a system supporting the assisted creation of media content documenting the details of completing a step-by-step project in an Internet-based, social networking/social e-commerce environment, in accordance with a representative embodiment of the present invention.

FIG. 20 shows exemplary screen image 2000 of an approach to guiding a user in creating a new project involving particular tools using a system supporting the assisted creation of content documenting the details of completing a step-by-step project in an Internet-based, social networking/social e-commerce environment, in accordance with a representative embodiment of the present invention. The screen image 2000 may be presented to a user following the selection of a user interface element such as, for example, the "Use It" user interface element 1824 of FIG. 18, which may be selected/clicked-on by the user to request the creation of a new project using particular tools selected by the user.

The illustration of FIG. 20 includes a project name field 2002, which is used by the project creator to identify the new project, and a project image portion 2004 which may be used to represent the project in project views and/or as a "Main" image in detailed information about the project. The illustration of FIG. 20 also includes a drop-down list 2006, to permit the user to categorize the project based on, by way of example and not limitation, the tools used, the materials used, the project cost, and/or the room with which the completed project is associated. In the example of FIG. 20, the user has selected the "tools" option on the drop-down list 1506. FIG. 20 also includes a collection of information about tools 2008 that are used for the project. Additional tools may be added to the collection using an "Add more tools" button 2009.

Figure 21:
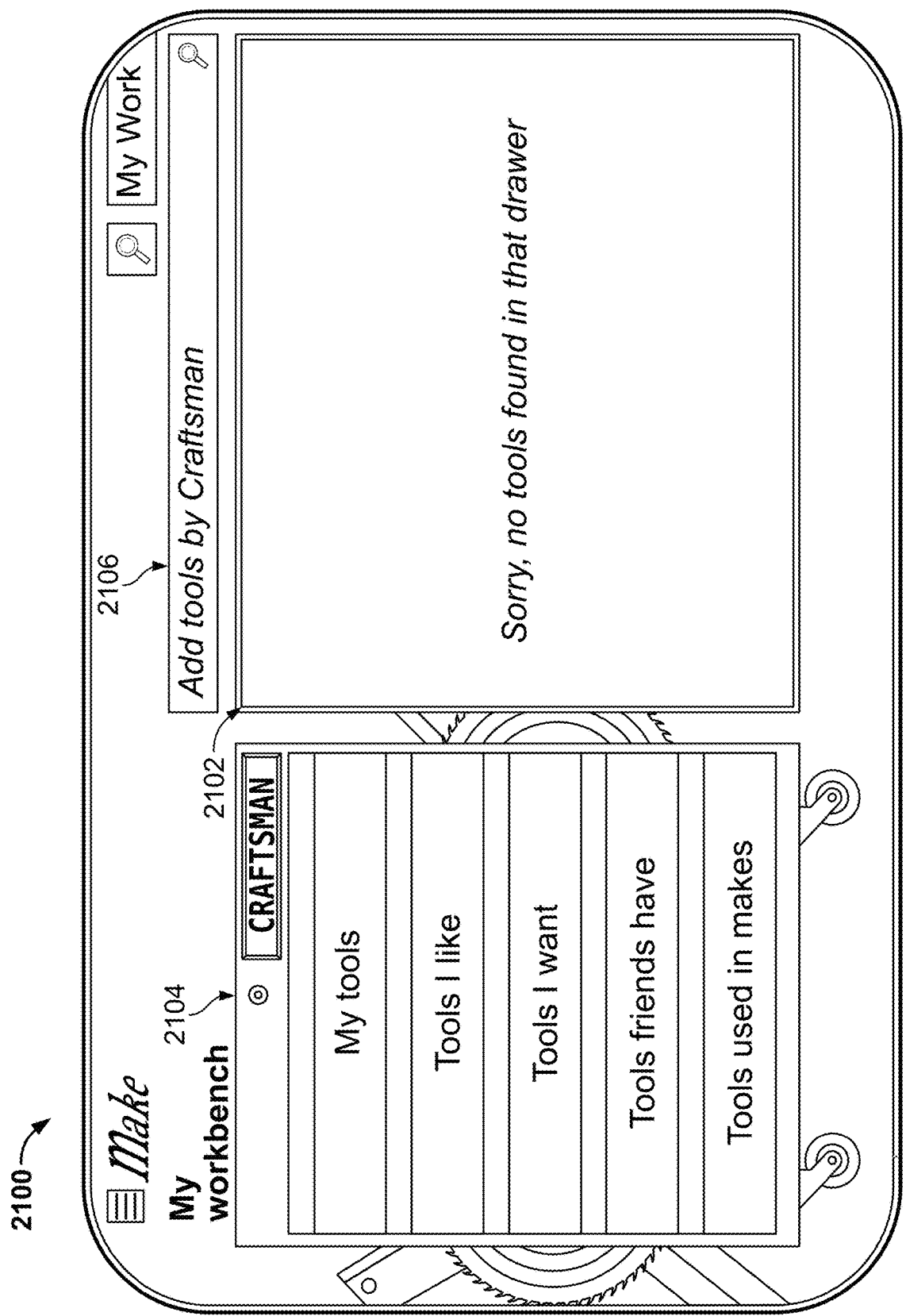
FIG. 21 shows exemplary screen image that may be generated by a system supporting the assisted creation of media content documenting the details of completing a step-by-step project in an Internet-based, social networking/social e-commerce environment, in accordance with a representative embodiment of the present invention.

FIG. 21 shows exemplary screen image 2100 that may be generated by a system supporting the assisted creation of content documenting the details of completing a step-by-step project in an Internet-based, social networking/social e-commerce environment, in accordance with a representative embodiment of the present invention. The illustration of FIG. 21 shows a "workbench" 2104 of a user, which may correspond to, for example, any of the "workbenches" of FIGS. 15-18. FIG. 21 also includes a "pegboard" 2102, shown without tools, which may be displayed upon user selection of an "empty" drawer of the "workbench" 2104. Also included in FIG. 21 is a search bar 2106, which may be used to search for tools to be added to one or more drawers of the "workbench" 2104.

Figure 22:
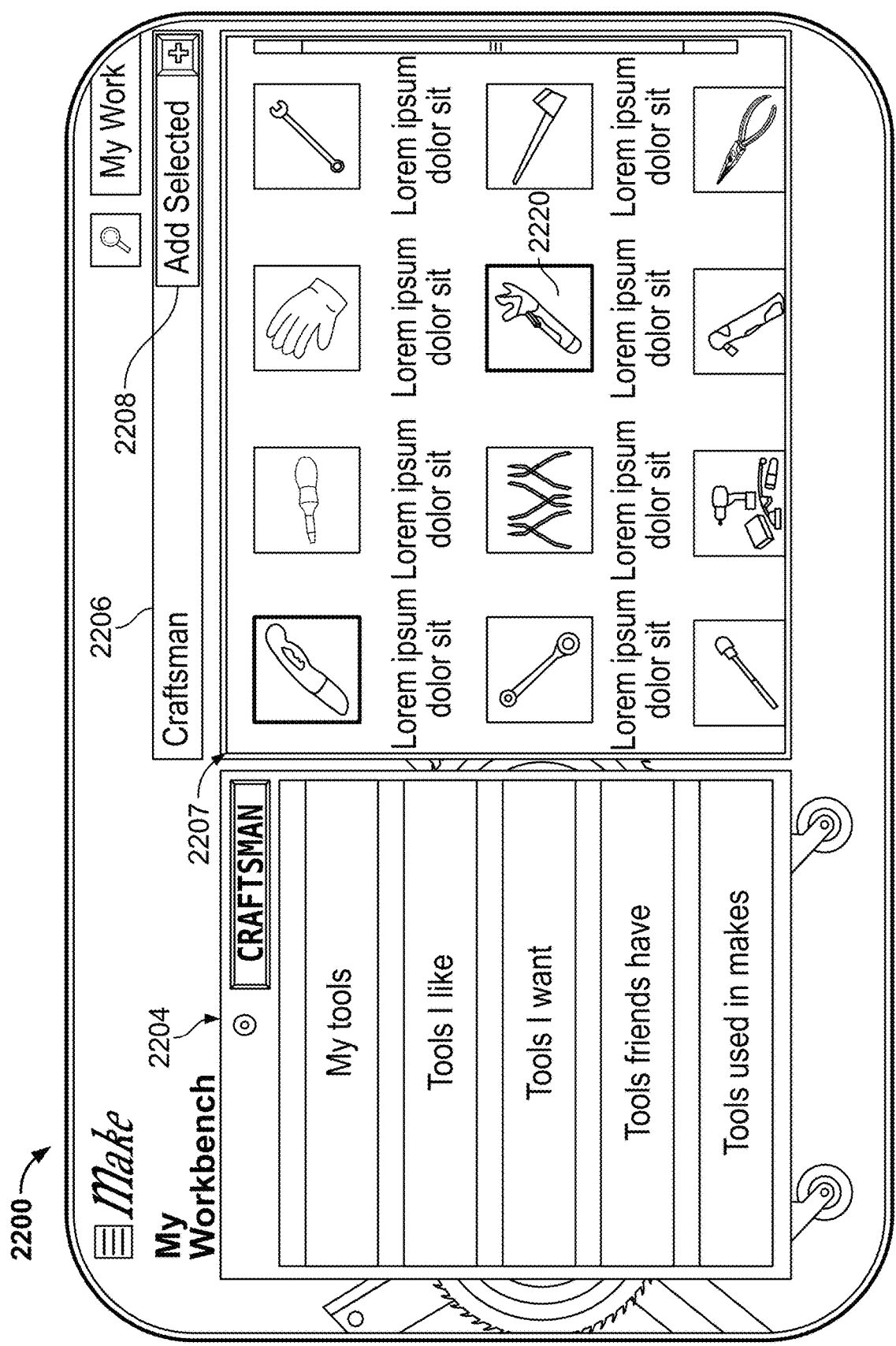
FIG. 22 shows exemplary screen image that may be displayed to a user following user entry of criteria in a search box to search for suitable tools for a project, which may be generated by a system supporting the assisted creation of media content documenting the details of completing a step-by-step project in an Internet-based, social networking/social e-commerce environment, in accordance with a representative embodiment of the present invention.

FIG. 22 shows exemplary screen image 2200 that may be displayed to a user following user entry of criteria in a search box 2206 to search for suitable tools for a project, which may be generated by a system supporting the assisted creation of content documenting the details of completing a step-by-step project in an Internet-based, social networking/social e-commerce environment, in accordance with a representative embodiment of the present invention. The illustration of FIG. 22 shows a "workbench" 2204 of a user, which may correspond to, for example, any of the "workbenches" of FIGS. 15-20, and which may not contain all of the tools involved in completion of a project of interest to the user. FIG. 22 includes a search bar 2206 that may be used to search for tools identified by, for example, a particular brand, type, use, and/or tag, to be added to a "pegboard" of one or more drawers of the "workbench" 2204. Tools matching the search criteria entered in the search box 2206 may be displayed in the search results box 2207. The user may then select one or more of the tools shown in the search results box 2207 that they wish to add to a "pegboard" of one or more drawers. As each tool is selected from the search results box 2207 by the user, the corresponding image may be highlighted or marked with an indicia, as in example highlighted tool 2220. Once all tools have been selected by the user from the search results box 2207, the user may add the selected tools to the "pegboard" by selecting the "Add selected" user interface element 2208. If the search reveals more tools than will fit within the search results box 2207, a scroll bar may be provided to enable the user access to all tools identified by the search.

Figure 23:
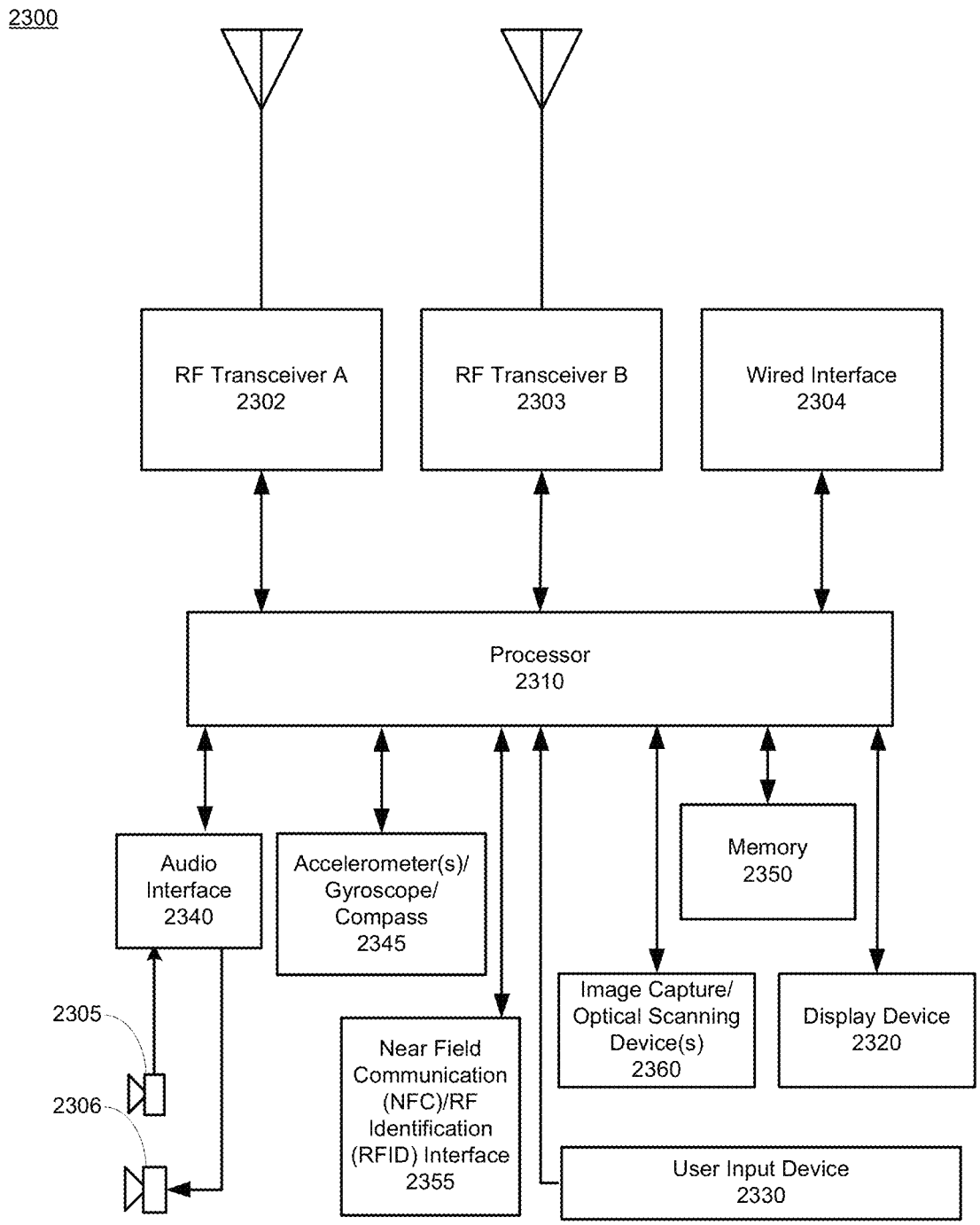
FIG. 23 is a block diagram illustrating a personal electronic device that may correspond, for example, to electronic devices shown in FIG. 1, in accordance with a representative embodiment of the present invention.

FIG. 23 is a block diagram illustrating a personal electronic device 2300 that may correspond, for example, to electronic devices 20', 20', 20" shown in FIG. 1, in accordance with a representative embodiment of the present invention. The personal electronic device 2300 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 23, the personal electronic device 2300 includes a processor 2310, an RF transceiver A 2302, an RF transceiver B 2303, a wired interface 2304, a display device 2320, a user input device 2330, an audio interface 2340, and a memory 2350. The processor 2310 may be, for example, a suitable microprocessor or microcomputer having sufficient computing power to control the personal electronic device 2300, and is operably coupled to the RF transceiver A 2302, the RF transceiver B 2303, and the wired interface 2304. The RF transceiver A 2302 and RF transceiver B 2303 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, or any other wireless network known now or in the future. The wired interface 2304 may comprise any necessary circuitry, logic, and software/firmware for wired communication over any of, for example, an Ethernet, Universal Serial Bus, FireWire (IEEE 1394) or other wired networks known now or in the future.

The processor 2310 is also operably coupled to the memory 2350, and may be used for non-transitory storage of executable program instructions, parameters, and data for any of the circuitry of the personal electronic device 2300. The display device 2320 is also operably coupled to the processor 2310, and may comprise, for example, one or more LED, OLED, LCD, or other form of visual display capable of presenting text or graphics, and may comprise any circuitry, logic, or software/firmware to support, for example, a graphical user interface (GUI). The user input device 2330 may comprise, for example, suitable switches, buttons, or touch sensitive surfaces to enable user control and operation of the personal electronic device 2300, and may comprise any necessary circuitry, logic, and software/firmware to allow it to perform those functions. In a representative embodiment of the present invention, the user input device 2330 may be a touch sensitive surface at the viewing side of the display device 2320, enabling a user to use the touch sensitive surface of the display device to enter user inputs and respond to displayed information. The audio interface 2340 comprises any necessary circuitry, logic, and software to interface a microphone 2305 and a speaker 2306 to the processor 2310.

A representative embodiment of the present invention may be seen in a method of operating a system that supports the assisted creation of media content documenting the details of completing a step-by-step project by a user in a social e-commerce environment. Such a method may comprise, in a computer system supporting e-commerce activities of a plurality of users, in response to a request of a first user of the plurality of users, recording creation of a project comprising a plurality of project steps, and associating the project with the first user. The method may also comprise receiving, from the first user, information identifying a source of one or more images for use in creating the plurality of project steps, and retrieving the one or more images from the source to form a collection of images. The method may further comprise associating one or more images selected from the collection by the first user, with one or more project steps selected by the first user from the plurality of project steps, and associating information for a product selected by the first user with a portion of at least one of the one or more images selected by the first user. The method may also comprise, in response to a request of a second user, delivering, to a user device of the second user, media content representative of one or more of the plurality of project steps.

In various representative embodiments of the present invention, the plurality of users may be members of a loyalty program of a merchant, the information identifying a source of one or more images may comprise a universal resource locator (URL), and the media content representative of one or more of the plurality of project steps may comprise hypertext markup language (HTML). Retrieving the one or more images from the source may comprise analyzing information comprising one of a page description language and a markup language to enable retrieval of the one or more images.

In some representative embodiments of the present invention, the method may further comprise notifying one or more members of a social network of the first user, of the creation of the project by the first user. Communication between members of the social network may be provided by the computer system. The method may further comprise tracking selection of products by the plurality of users for association with a portion of at least one image of a project, and may also comprise providing to the second user, a list of all products associated with steps of the project. A representative embodiment of the present invention may comprise placing one or more orders for delivery, to the second user, of products associated with the project, and may comprise associating information for a product selected by the second user with a portion of at least one of the one or more images selected by the first user.

Further aspects of the present invention may be observed in a computer system that supports the assisted creation of media content documenting the details of completing a step-by-step project by a user in a social e-commerce environment. Such a computer system may comprise at least one processor supporting e-commerce activities of a plurality of users, the at least one processor for communicatively coupling to a device of a first user and a device of a second user. The at least one processor may be operable to, at least, perform the method described above.

Additional aspects of the present invention may be found in a non-transitory computer-readable medium having a plurality of code sections, where each code section comprises a plurality of instructions executable by at least one processor of a computer system. The executable instructions may cause the at least one processor to perform the steps of a method supporting assisted creation of media content documenting the details of completing a step-by-step project by a user in a social e-commerce environment, where the steps comprising those of the method described above.

Although devices, methods, and systems according to the present invention may have been described in connection with a preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of operating a system that supports an assisted creation of web page media content documenting details of completing a step-by-step project by a user in an Internet-based social e-commerce environment, the method comprising:

in a computer system configured to process retail transactions of a merchant and to communicate with user devices of a plurality of users, the computer system having memory configured for storing web pages representative of step-by-step projects for the plurality of users and for storing web pages for one or more step variations on specific steps of projects of said plurality of projects, said step variations submitted by any of the plurality of users, said computer system supporting Internet-based e-commerce activities of the merchant for the plurality of users, in response to a request of a first user of the plurality of users, recording a creation of a project comprising one or more web pages for a plurality of project steps, and associating the project with the first user in said memory;

receiving, from the first user, information identifying one or more sources of one or more images for use in creating the one or more web pages for the plurality of project steps, wherein the information identifying the one or more sources can also identify both a personal mobile device and a website that includes a different step-by-step project;

determining whether the information identifying the one or more sources identifies one or both of the personal mobile device and one or more web pages accessible via a public network;

retrieving the one or more images from network locations identified by parsing markup language descriptions of the one or more web pages, wherein the parsing enables identifying items of media content and determining whether the items of media content are part of or accessible via the one or more web pages;

based on the parsing, categorizing the items of media content as different types of media content in a visual catalog for display to the first user, wherein the items of the media content are selectable by the first user for use in creating the one or more webpages for the plurality of project steps;

associating one or more images selected from the visual catalog by the first user, with one or more project steps selected by the first user from the plurality of project steps;

associating information for a product selected by the first user with a portion of at least one of the one or more images selected by the first user;

in response to a request by a second user of the plurality of users to create a second project based on the project of the first user, adding information about one or both alternative tools and alternative products that can be used instead or in addition to tools or products used in the project of the first user;

adding comments by the second user about particular project steps of the project of the first user;

adding images relating to alternative results to results of the project of the first user;

creating web pages for one or more additional project steps as step variations, and associating the one or more step variations with respective project steps of the project of the first user, each step variation comprising a customization by the second user of a particular existing project step of the project of the first user; and in response to a request of a third user of the plurality of users, delivering, to a user device of the third user, web pages containing media content representative of one or more of the plurality of project steps of the project of the first user, and one or more step variations selected by the third user.

2. The method according to claim 1, wherein the plurality of users are members of a loyalty program of the merchant.

3. The method according to claim 1, wherein the information identifying a source of one or more images comprises a universal resource locator (URL).

4. The method according to claim 1, wherein the media content representative of one or more of the plurality of project steps comprises hypertext markup language (HTML).

5. The method according to claim 1, wherein the method further comprises:

notifying one or more members of a social network of the first user, of the creation of the project by the first user.

6. The method according to claim 5, wherein communication between members of the social network is provided by the computer system.

7. The method according to claim 1, wherein the method further comprises:

tracking selection of products by the plurality of users for association with a portion of at least one image of a project.

8. The method according to claim 1, wherein the method further comprises:

providing to the second user, a list of all products associated with steps of the project of the first user.

9. The method according to claim 1, wherein the method further comprises:

placing one or more orders for delivery, to the second user, of products associated with the project of the first user by one or both of the first user and the second user.

10. The method according to claim 1, wherein the method further comprises:

associating information for a product selected by the second user with a portion of at least one of the one or more images selected by the first user.

11. A computer system that supports an assisted creation of web page media content documenting details of completing a step-by-step project by a user in an Internet-based social e-commerce environment, the computer system comprising:

at least one processor configured to process retail transactions of a merchant and to communicate with user devices of a plurality of users, the at least one processor communicatively coupled to memory configured for storing web pages representative of step-by-step projects for the plurality of users and for storing web pages for one or more step variations on specific steps of projects of said plurality of projects, said step variations submitted by any of the plurality of users, said at least one processor supporting Internet-based e-commerce activities of a plurality of users, the at least one processor operable to, at least:

in response to a request of a first user of the plurality of users, record creation of a project comprising one or more web pages for a plurality of project steps, and associate the project with the first user in said memory;

receive, from the first user, information identifying one or more sources of one or more images for use in creating the one or more web pages for the plurality of project steps, wherein the information identifying the one or more sources can also identify both a personal mobile device and a website that includes a different step-by-step project;

determine whether the information identifying the one or more sources identifies one or both of the personal mobile device and one or more web pages accessible via a public network;

retrieve the one or more images from network locations identified by parsing markup language descriptions of the one or more web pages, wherein the parsing enables identifying items of media content and determining whether the items of media content are part of or accessible via the one or more web pages;

based on the parsing, categorize the items of media content as different types of media content in a visual catalog for display to the first user, wherein the items of the media content are selectable by the first user for use in creating the one or more webpages for the plurality of project steps;

associate one or more images selected from the visual catalog by the first user, with one or more project steps selected by the first user from the plurality of project steps;

associate information for a product selected by the first user with a portion of at least one of the one or more images selected by the first user;

in response to a request by a second user of the plurality of users to create a second project based on the project of the first user, add information about one or both alternative tools and alternative products that can be used instead or in addition to tools or products used in the project of the first user;

add comments by the second user about particular project steps of the project of the first user;

add images relating to alternative results to results of the project of the first user;

create web pages for one or more additional project steps as step variations, and associate the one or more step variations with respective project steps of the project of the first user, each step variation comprising a customization by the second user of a particular existing project step of the project of the first user; and in response to a request of a third user of the plurality of users, deliver, to a user device of the third user, web pages containing media content representative of one or more of the plurality of project steps of the project of the first user, and one or more step variations selected by the third user.

12. The system according to claim 11, wherein the plurality of users are members of a loyalty program of the merchant.

13. The system according to claim 11, wherein the information identifying a source of one or more images comprises a universal resource locator (URL).

14. The system according to claim 11, wherein the media content representative of one or more of the plurality of project steps comprises hypertext markup language (HTML).

15. The system according to claim 11, wherein the at least one processor is operable to, at least:

notify one or more members of a social network of the first user, of the creation of the project by the first user.

16. The system according to claim 15, wherein communication between members of the social network is provided by the computer system.

17. The system according to claim 11, wherein the at least one processor is operable to, at least:

track selection of products by the plurality of users for association with a portion of at least one image of a project.

18. The system according to claim 11, wherein the at least one processor is operable to, at least:

provide to the second user, a list of all products associated with steps of the project of the first user.

19. The system according to claim 11, wherein the at least one processor is operable to, at least:

place one or more orders for delivery, to the second user, of products associated with the project of the first user by one or both of the first user and the second user.

20. The system according to claim 11, wherein the at least one processor is operable to, at least:

associate information for a product selected by the second user with a portion of at least one of the one or more images selected by the first user.

21. A non-transitory computer-readable medium having a plurality of code sections, each code section comprising a plurality of instructions executable by at least one processor of a computer system configured to process retail transactions of a merchant and to communicate with user devices of a plurality of users, the at least one processor communicatively coupled to memory configured for storing web pages representative of step-by-step projects for the plurality of users and for storing web pages for one or more step variations on specific steps of projects of said plurality of projects, said step variations submitted by any of the plurality of users, to cause the at least one processor to perform the steps of a method supporting an assisted creation of web page media content documenting details of completing a step-by-step project by a user in an Internet-based social e-commerce environment, the steps comprising:

in response to a request of a first user of the plurality of users, recording creation of a project comprising one or more web pages for a plurality of project steps, and associating the project with the first user in said memory;

receiving, from the first user, information identifying one or more sources of one or more images for use in creating the one or more web pages for the plurality of project steps, wherein the information identifying the one or more sources can also identify both a personal mobile device and a website that includes a different step-by-step project;

determining whether the information identifying the one or more sources identifies one or both of the personal mobile device and one or more web pages accessible via a public network;

retrieving the one or more images from network locations identified by parsing markup language descriptions of the one or more web pages, wherein the parsing enables identifying items of media content and determining whether the items of media content are part of or accessible via the one or more web pages;

based on the parsing, categorizing the items of media content as different types of media content in a visual catalog for display to the first user, wherein the items of the media content are selectable by the first user for use in creating the one or more webpages for the plurality of project steps;

associating one or more images selected from the visual catalog by the first user, with one or more project steps selected by the first user from the plurality of project steps;

associating information for a product selected by the first user with a portion of at least one of the one or more images selected by the first user;

in response to a request by a second user of the plurality of users to create a second project based on the project of the first user,
- adding information about one or both alternative tools and alternative products that can be used instead or in addition to tools or products used in the project of the first user;
- adding comments by the second user about particular project steps of the project of the first user;
- adding images relating to alternative results to results of the project of the first user;
- creating web pages for one or more additional project steps as step variations, and
- associating the one or more step variations with respective project steps of the project of the first user, each step variation comprising a customization by the second user of a particular existing project step of the project of the first user; and in response to a request of a third user of the plurality of users, delivering, to a user device of the third user, web pages containing media content representative of one or more of the plurality of project steps.

22. The non-transitory computer-readable medium according to claim 21, wherein the plurality of users are members of a loyalty program of the merchant.

23. The non-transitory computer-readable medium according to claim 21, wherein the information identifying a source of one or more images comprises a universal resource locator (URL).

24. The non-transitory computer-readable medium according to claim 21, wherein the media content representative of one or more of the plurality of project steps comprises hypertext markup language (HTML).

25. The non-transitory computer-readable medium according to claim 21, wherein the steps further comprise:
notifying one or more members of a social network of the first user, of the creation of the project by the first user.

26. The non-transitory computer-readable medium according to claim 25, wherein communication between members of the social network is provided by the computer system.

27. The non-transitory computer-readable medium according to claim 21, wherein the steps further comprise:
tracking selection of products by the plurality of users for association with a portion of at least one image of a project.

28. The non-transitory computer-readable medium according to claim 21, wherein the method further comprises:
providing to the second user, a list of all products associated with steps of the project of the first user.

29. The non-transitory computer-readable medium according to claim 21, wherein the steps further comprise:
placing one or more orders for delivery, to the second user, of products associated with the project of the first user by one or both of the first user and the second user.

30. The non-transitory computer-readable medium according to claim 21, wherein the steps further comprise:
associating information for a product selected by the second user with a portion of at least one of the one or more images selected by the first user.

* * * * *